(12) United States Patent
Binnig et al.

(10) Patent No.: US 7,801,361 B2
(45) Date of Patent: Sep. 21, 2010

(54) ANALYZING PIXEL DATA USING IMAGE, THEMATIC AND OBJECT LAYERS OF A COMPUTER-IMPLEMENTED NETWORK STRUCTURE

(75) Inventors: Gerd Binnig, Kottgeisering (DE); Guenter Schmidt, Munich (DE)

(73) Assignee: Definiens AG, Munich (DE)

( * ) Notice: Subject to any disclaimer, the term of this patent is extended or adjusted under 35 U.S.C. 154(b) by 876 days.

(21) Appl. No.: 11/709,601

(22) Filed: Feb. 21, 2007

(65) Prior Publication Data

US 2008/0008349 A1    Jan. 10, 2008

Related U.S. Application Data

(63) Continuation-in-part of application No. 11/511,930, filed on Aug. 28, 2006.

(30) Foreign Application Priority Data

Oct. 15, 2002  (DE) ................ 102 48 013
Apr. 8, 2005   (DE) ............ 10 2005 016 290

(51) Int. Cl.
    *G06K 9/70*    (2006.01)
(52) U.S. Cl. .............. 382/227; 382/158; 382/195; 382/305
(58) Field of Classification Search ........... 382/100, 382/158, 190, 195, 224, 226, 227
    See application file for complete search history.

(56) References Cited

U.S. PATENT DOCUMENTS 4,868,733 A    9/1989  Fujisawa et al. ............ 364/200

(Continued)

FOREIGN PATENT DOCUMENTS

DE    199 08204 A1    10/1998

(Continued)

OTHER PUBLICATIONS

English translation of the international preliminary report on patentability in international application PCT/EP2006/061498, to which U.S. Appl. No. 11/511,930 claims priority (Oct. 18, 2007).

(Continued)

*Primary Examiner*—Gregory M Desire
(74) *Attorney, Agent, or Firm*—Imperium Patent Works; Darien K. Wallace

(57) ABSTRACT

An analysis system analyzes and measures patterns present in the pixel values of digital images using a computer-implemented network structure that includes a process hierarchy, a class network and a data network. The data network includes image layers, thematic layers and object networks. Various types of processing are performed depending on whether the data of the digital images is represented in the image, thematic or object layers. Pixel-oriented and object-oriented processing is combined so that fewer computations and less memory are used to analyze the digital images. Pixel-oriented processes, such as filtering, are selectively performed only at pixel locations that are assigned to a specified thematic class of a thematic layer or that are linked to a particular object of the object network. Similarly, object-oriented processing is performed at pixel locations linked to objects generated using thematic layers or using image layers on which pixel-oriented processes have already been performed.

29 Claims, 33 Drawing Sheets

U.S. PATENT DOCUMENTS

| | | | | |
|---|---|---|---|---|
| 4,922,432 | A | 5/1990 | Kobayashi et al. | 364/490 |
| 5,170,347 | A | 12/1992 | Tuy et al. | 364/413.22 |
| 5,297,215 | A | 3/1994 | Yamagishi | 382/6 |
| 5,331,554 | A | 7/1994 | Graham | 364/419.07 |
| 5,351,311 | A * | 9/1994 | Rogers et al. | 382/156 |
| 5,383,472 | A | 1/1995 | Devlin et al. | 128/771 |
| 5,537,485 | A | 7/1996 | Nishikawa et al. | 382/130 |
| 5,579,393 | A | 11/1996 | Conner et al. | 380/25 |
| 5,870,493 | A * | 2/1999 | Vogl et al. | 382/195 |
| 5,872,859 | A | 2/1999 | Gur et al. | 382/128 |
| 5,966,701 | A | 10/1999 | Kohda et al. | 706/20 |
| 5,983,210 | A | 11/1999 | Imasaki et al. | 706/15 |
| 6,018,728 | A | 1/2000 | Spence et al. | 706/20 |
| 6,023,663 | A * | 2/2000 | Kim | 702/81 |
| 6,058,206 | A | 5/2000 | Kortge | 382/159 |
| 6,058,322 | A | 5/2000 | Nishikawa et al. | 600/408 |
| 6,075,878 | A | 6/2000 | Yoshida et al. | 382/132 |
| 6,075,879 | A | 6/2000 | Roehrig et al. | 382/132 |
| 6,151,679 | A | 11/2000 | Friedman et al. | 726/3 |
| 6,246,782 | B1 | 6/2001 | Shapiro et al. | 382/128 |
| 6,282,305 | B1 | 8/2001 | Huo et al. | 382/128 |
| 6,320,976 | B1 | 11/2001 | Murthy et al. | 382/128 |
| 6,324,532 | B1 | 11/2001 | Spence et al. | 706/27 |
| 6,389,305 | B1 | 5/2002 | Deban et al. | 600/427 |
| 6,453,058 | B1 | 9/2002 | Murthy et al. | 382/128 |
| 6,574,357 | B2 | 6/2003 | Wang | 382/132 |
| 6,625,303 | B1 | 9/2003 | Young et al. | 382/132 |
| 6,650,766 | B1 | 11/2003 | Rogers et al. | 382/132 |
| 6,681,017 | B1 | 1/2004 | Matias et al. | 380/277 |
| 6,751,621 | B1 | 6/2004 | Calistri-Yeh et al. | 707/100 |
| 6,757,665 | B1 * | 6/2004 | Unsworth et al. | 706/15 |
| 6,763,128 | B1 | 7/2004 | Rogers et al. | 382/130 |
| 6,778,705 | B2 * | 8/2004 | Gutta et al. | 382/224 |
| 6,801,645 | B1 | 10/2004 | Collins et al. | 382/130 |
| 6,871,199 | B1 | 3/2005 | Binnig et al. | 707/0.5 |
| 6,937,776 | B2 | 8/2005 | Li et al. | 382/260 |
| 6,944,603 | B2 | 9/2005 | Bergan et al. | 706/45 |
| 6,970,587 | B1 | 11/2005 | Rogers | 382/132 |
| 7,254,285 | B1 * | 8/2007 | Paek et al. | 382/305 |
| 7,437,004 | B2 | 10/2008 | Baatz et al. | 382/224 |
| 7,533,406 | B2 * | 5/2009 | Ludvig et al. | 725/110 |
| 2001/0031920 | A1 | 10/2001 | Kaufman et al. | 600/431 |
| 2002/0030811 | A1 | 3/2002 | Schindler | 356/318 |
| 2002/0041328 | A1 | 4/2002 | LeCompte et al. | 348/144 |
| 2002/0188436 | A1 | 12/2002 | Schmidt et al. | 704/1 |
| 2003/0016869 | A1 * | 1/2003 | Laumeyer et al. | 382/190 |
| 2003/0035773 | A1 | 2/2003 | Totterman et al. | 424/9.1 |
| 2003/0072484 | A1 * | 4/2003 | Kokko et al. | 382/155 |
| 2003/0115175 | A1 * | 6/2003 | Baatz et al. | 707/1 |
| 2004/0148296 | A1 | 7/2004 | Schaepe et al. | 707/100 |
| 2005/0265588 | A1 | 12/2005 | Gholap et al. | 382/128 |
| 2008/0008349 | A1 * | 1/2008 | Binnig et al. | 382/100 |

FOREIGN PATENT DOCUMENTS

WO      WO 01/45033 A2    12/1999

OTHER PUBLICATIONS

Schaepe, Urbani, Leiderer and Athelogou, "Fraktal hierarchische, prozess- und objektbasierte Bildanalyse. Anwendung in der biomedizinischen Mikroskopie," Bildverarbeitung fuer die Medizin, Mar. 9, 2003, pp. 206-210, XP002282616.

U.S. Appl. No. 09/806,727, filed Sep. 24, 1999, Schmidt et al.

Benz, Hofmann, Willhauck, Lingenfelder and Heynen, "Multi-resolution, object-oriented fuzzy analysis of remote sensing data for GIS-ready information," ISPRS Journal of Photography & Remote Sensing, vol. 58, No. 3-4, Dec. 16, 2003; (XP002440464); pp. 239-258.

Ruan, Bürkle and Dudeck, "An object oriented design for automated navigation of semantic networks inside a medical data dictionary," Artificial Intelligence in Medicine, vol. 18, No. 1, Jan. 31, 2000 (XP002440465) ; pp. 83-103.

Apte, Morgenstern and Hong, "AI at IBM Research," IEEE Intelligent Systems, vol. 15, No. 6, Dec. 31, 2000 (XP002440466) ; pp. 51-57.

Schaepe, Urbani, Leiderer and Athelogou, "Fraktal hierarchische, prozess- and objektbasierte Bildanalyse. Anwendung in der biomedizinischen Mikroskopie," Bildverarbeitung fuer die Medizin 2003, Informatik Aktuell, Dec. 31, 2003, (XP002440467); 3 pages.

* cited by examiner

SPECIFICATION MODE

EXECUTION MODE

| inner_x | inner_y | level_name | class_name | Area (Pxl) | Asymmetry | Roundness |
|---|---|---|---|---|---|---|
| 1164 | 1261 | nuclei | A#4 | 165 | 0.083486978 | 0.265997821 |
| 562 | 1053 | nuclei | A#4 | 126 | 0.796230685 | 0.303528832 |
| 742 | 925 | nuclei | A#4 | 125 | 0.68844998 | 0.651273756 |
| 1260 | 678 | nuclei | A#4 | 239 | 0.188594613 | 0.172351612 |
| 936 | 638 | nuclei | A#4 | 64 | 0.187500095 | 0.070187346 |
| 15 | 470 | nuclei | A#4 | 149 | 0.21247481 | 0.339249794 |
| 870 | 141 | nuclei | A#4 | 28 | 0.066483242 | 0.200954518 |
| 654 | 1265 | nuclei | A#4 | 229 | 0.173658675 | 0.085476008 |
| 95 | 1225 | nuclei | A#4 | 240 | 0.321608409 | 0.17472213 |
| 19 | 1213 | nuclei | A#4 | 176 | 0.249107139 | 0.365155834 |
| 391 | 1139 | nuclei | A#4 | 164 | 0.174725895 | 0.191897935 |
| 71 | 1127 | nuclei | A#4 | 240 | 0.564776023 | 0.186812392 |
| 347 | 1103 | nuclei | A#4 | 196 | 0.430353073 | 0.605161095 |
| 341 | 1071 | nuclei | A#4 | 108 | 0.300640029 | 0.406612778 |
| 1060 | 1074 | nuclei | A#4 | 219 | 0.608461471 | 0.418086196 |
| 725 | 1027 | nuclei | A#4 | 13 | 0.322284896 | 0.466837309 |
| 183 | 1031 | nuclei | A#4 | 248 | 0.483274057 | 0.443820825 |
| 373 | 1025 | nuclei | A#4 | 228 | 0.256724743 | 0.443184016 |
| 265 | 1021 | nuclei | A#4 | 96 | 0.271390448 | 0.584776661 |
| 486 | 1005 | nuclei | A#4 | 244 | 0.44119981 | 0.255556091 |
| 349 | 1003 | nuclei | A#4 | 176 | 0.537272378 | 0.639403802 |
| 23 | 985 | nuclei | A#4 | 236 | 0.296927426 | 0.226018542 |
| 247 | 965 | nuclei | A#4 | 200 | 0.412449977 | 0.462624771 |
| 135 | 937 | nuclei | A#4 | 116 | 0.683090801 | 0.837961433 |

```xml
<?xml version="1.0" encoding="UTF-8"?>
- <eCog.Proc UserName="guenter" Company="Definiens AG" Copyright=""
  version="20060824" use-reproducable-poly="1" NumLvl="1" project-unit="1"
  engine-version="6.0.2" engine-build="727">
    <!-- Below are Image Layers -->
+ <ImgLayers>
    <!-- Below are Thematic Layers -->
+ <ThmLayers>
    <!-- Below are Map Layers -->
+ <MapLvlProxyCntnr>
  <ParamValueSetCntnr>
    <!-- Below are Variables for Process Steps -->
+ <ProcVrblCntnr>
    <!-- Below are the Classes of the Class Network; See, e.g., class network 12
    in FIG. 3 -->
+ <ClssHrchy EvalInvalid="1" MinProb="0.10000000000000001"
  NNSlope="0.20000000000000001" PrjctBaseUnit="1" RdiResamplOptns="3"
  NumGisChnl="2">
    <!-- Below are Samples for Training the Analysis System -->
+ <Smpls>
  <CustProcAlgrList></CustProcAlgrList>
    <!-- Below are Process Steps of the Process Hierarchy; See, e.g., process
    hierarchy 11 of FIG. 3 -->
- <ProcessList>
      <!-- Below is the Root Process Step of the method for detecting nuclear
      membranes of FIG. 10 -->
    + <ProcBase Name="test pure pixel processing" bLoopChg="0" iMaxCycle="1"
      bExpand="1" bActive="1" bAutoName="0" bSubrtn="0" sComment="">
                <!-- Below is a process step for applying a Gaussian filter;
                See, e.g., item 105 in FIG. 15 -->
                <ProcBase Name="Gauss 3d filter Gauss -> Gauss[21,1] if -/*"
                bLoopChg="0" iMaxCycle="1" bExpand="1" bActive="1"
                bAutoName="1" bSubrtn="0" sComment="">
                <!-- Below is a process step for generating a thematic layer;
                See, e.g., item 107 in FIG. 17 -->
                <ProcBase Name="*them layer[A#1,X(1),A#4]" bLoopChg="0"
                iMaxCycle="1" bExpand="1" bActive="1" bAutoName="1" bSubrtn="0"
                sComment="">
                <!-- Below is a process step for expanding a thematic layer;
                See, e.g., item 109 in FIG. 18 -->
                <ProcBase Name="4x: grow them layer/A#5 into X#1 if
                density>2/0, fill with A#4" bLoopChg="0" iMaxCycle="4"
                bExpand="1" bActive="1" bAutoName="1" bSubrtn="0" sComment="">
            <!-- Below are process steps for object-oriented processing -->
            <ProcBase Name="O-processing" bLoopChg="0" iMaxCycle="1" bExpand="0"
            bActive="1" bAutoName="0" bSubrtn="0" sComment="">
                <!-- Below is a process step shown at the bottom of the process
                hierarchy in FIG. 19 for assigning the thematic class "A#4" to
                pixel values associated with nuclei -->
                <ProcBase Name="A#4 at nuclei: for all" bLoopChg="0" iMaxCycle="1"
                bExpand="1" bActive="1" bAutoName="1" bSubrtn="0" sComment="">
        <!-- Below is a process step shown at the bottom of the process
        hierarchy in FIG. 20 that takes 0.14 seconds -->
        <ProcBase Name="A#4 at nuclei: export object statistics" bLoopChg="0"
        iMaxCycle="1" bExpand="1" bActive="1" bAutoName="1" bSubrtn="0"
        sComment="">
  </ProcessList>
  <ExportedItems>
  <LcnsIds></LcnsIds>
- <Behaviour>
      <DistCalc mode="SER"></DistCalc>
  </Behaviour>
</eCog.Proc>
```

FIG. 31

```xml
<?xml version="1.0" encoding="UTF-8"?>
<eCog.Proc UserName="guenter" Company="Definiens AG" Copyright=""
version="20060824" use-reproducable-poly="1" NumLvl="1" project-unit="1"
engine-version="6.0.2" engine-build="727">
  <!-- Below are Image Layers -->
  <ImgLayers>
   <ChnlProxyCntnr>
     <ChnlProxy strName="Gauss" Chnl="1" bUserSet="1" bTempChnl="1"
iLastSetChnlId="-1"></ChnlProxy>
   </ChnlProxyCntnr>
  </ImgLayers>
  <!-- Below are Thematic Layers -->
  <ThmLayers>
   <ChnlProxyCntnr>
     <ChnlProxy strName="them layer" Chnl="1" bUserSet="1" bTempChnl="1"
iLastSetChnlId="-1"></ChnlProxy>
     <ChnlProxy strName="Thematic Layer 1" Chnl="0" bUserSet="1" bTempChnl="0"
iLastSetChnlId="0"></ChnlProxy>
   </ChnlProxyCntnr>
  </ThmLayers>
  <!-- Below are Map Layers -->
  <MapLvlProxyCntnr>
   <MapLvlProxy strName="nuclei" MapLvl="1">
     <Scope GUID="00000000-0000-0000-0000-000000000000"></Scope>
   </MapLvlProxy>
  </MapLvlProxyCntnr>
 +<ParamValueSetCntnr>
  <!-- Below are Variables for Process Steps -->
 +<ProcVrblCntnr>
  <!-- Below are the Classes of the Class Network; See, e.g., class network 12
in FIG. 3 -->
   <ClssHrchy EvalInvalid="1" MinProb="0.10000000000000001"
NNSlope="0.20000000000000001" PrjctBaseUnit="1" RdiResamplOptns="3"
NumGisChnl="2">
    <AllClss>
    +<Clss id="16" name="_marked" flag="0" iMaskID="-1" termType="0"
     strUserName="guenter" tChngTime="1153209169" bShow="0" sComment="">
    +<Clss id="17" name="_helpers" flag="0" iMaskID="-1" termType="0"
     strUserName="guenter" tChngTime="1153209187" bShow="0" sComment="">
    +<Clss id="18" name="links" flag="0" iMaskID="-1" termType="0"
     strUserName="guenter" tChngTime="1153209745" bShow="0" sComment="">
    +<Clss id="27" name="A" flag="2" iMaskID="-1" termType="0"         125
     strUserName="Gerd" tChngTime="1159457260" bShow="0" sComment="">
     <Clss id="31" name="A#4" flag="0" iMaskID="-1" termType="0"
     strUserName="Gerd" tChngTime="1159514974" bShow="0" sComment="">
       <LensInfo sLensId="" sPwd=""></LensInfo>
       <Scope GUID="00000000-0000-0000-0000-000000000000"></Scope>
       <Color R="254" G="255" B="101"></Color>
       <SharedInfo bShared="0" strInstGUID=""></SharedInfo>
     </Clss>
    +<Clss id="33" name="A#5" flag="0" iMaskID="-1" termType="0"
     strUserName="Gerd" tChngTime="1159824471" bShow="0" sComment="">
    +<Clss id="240" name="unclassified" flag="0" iMaskID="-1" termType="0"
     strUserName="Gerd" tChngTime="1163109999" bShow="1" sComment="">
    +<Clss id="243" name="signals" flag="0" iMaskID="-1" termType="0"
     strUserName="guenter" tChngTime="1166449560" bShow="1" sComment="">
    +<Clss id="257" name="_LINK" flag="0" iMaskID="-1" termType="0"
     strUserName="Gerd" tChngTime="1165928974" bShow="1" sComment="">
    +<Clss id="258" name="_LINK 2" flag="0" iMaskID="-1" termType="0"
     strUserName="Gerd" tChngTime="1165929706" bShow="1" sComment="">
    +<Clss id="259" name="optimizer" flag="0" iMaskID="-1" termType="0"
     strUserName="guenter" tChngTime="1166447886" bShow="1" sComment="">
    +<Clss id="260" name="A#1" flag="0" iMaskID="-1" termType="0"
     strUserName="guenter" tChngTime="1166449683" bShow="1" sComment="">
```

FIG. 32A

```
+ <Clss id="261" name="X#1" flag="0" iMaskID="-1" termType="0"
  strUserName="guenter" tChngTime="1166449683" bShow="1" sComment="">
+ <Clss id="262" name="X" flag="0" iMaskID="-1" termType="0"
  strUserName="guenter" tChngTime="1166449683" bShow="1" sComment="">
</AllClss>
+<AllProps>
+<ChnlWghtBrght>
+<AllSubClss>
+<AllTerm>
</ClssHrchy>
<!-- Below are Samples for Training the Analysis System -->
<Smpls>
+<AllClss>
 <AllProp></AllProp>
</Smpls>
<CustProcAlgrList></CustProcAlgrList>
<!-- Below are Process Steps of the Process Hierarchy; See, e.g., process
hierarchy 11 of FIG. 3 -->
<ProcessList>
<!-- Below is the Root Process Step of the method for detecting nuclear
membranes of FIG. 10 -->
<ProcBase Name="test pure pixel processing" bLoopChg="0" iMaxCycle="1"
bExpand="1" bActive="1" bAutoName="0" bSubrtn="0" sComment="">
  <LensInfo sLensId="" sPwd=""></LensInfo>
  <Algorithm guid="A8BA5775-CC39-4194-9A6A-A64872EE1F81">
    <Params></Params>
  </Algorithm>
  <Domain>
    <ProcDomain sThmLayer="" iNumMaxObj="0" iVersion="4">
      <mClssFltr eState="0" bUnclsfy="0" bUseDmnTxt="1"></mClssFltr>
    </ProcDomain>
  </Domain>
  <SubProc>
  + <ProcBase Name="scale = 22" bLoopChg="0" iMaxCycle="1" bExpand="1"
    bActive="1" bAutoName="1" bSubrtn="0" sComment="">
  + <ProcBase Name="threshold = 300" bLoopChg="0" iMaxCycle="1" bExpand="1"
    bActive="1" bAutoName="1" bSubrtn="0" sComment="">
  + <ProcBase Name="quality = 0" bLoopChg="0" iMaxCycle="1" bExpand="1"
    bActive="1" bAutoName="1" bSubrtn="0" sComment="">
  + <ProcBase Name="31x: Optimizer[ fitness=quality, param. set=Optimzer
    Parameters, param. definition=optimizer, pop. size=4] " bLoopChg="0"
    iMaxCycle="31" bExpand="0" bActive="1" bAutoName="1" bSubrtn="0"
    sComment="">
  + <ProcBase Name="at nuclei: delete" bLoopChg="0" iMaxCycle="1" bExpand="1"
    bActive="1" bAutoName="1" bSubrtn="0" sComment="">
  + <ProcBase Name="update image layer statistics" bLoopChg="0" iMaxCycle="1"
    bExpand="1" bActive="1" bAutoName="1" bSubrtn="0" sComment="NUCLEUS">
        + <ProcBase Name="for all" bLoopChg="0" iMaxCycle="1" bExpand="0"
          bActive="1" bAutoName="1" bSubrtn="0" sComment="">
            + <ProcBase Name="for all" bLoopChg="0" iMaxCycle="1"
              bExpand="0" bActive="1" bAutoName="1" bSubrtn="0"
              sComment="FILTERS">
              + <ProcBase Name="image 1/2" bLoopChg="0" iMaxCycle="1"
                bExpand="1" bActive="1" bAutoName="0" bSubrtn="0"
                sComment="">
                <!-- Below is a process step for applying a Gaussian
                filter; See, e.g., item 105 in FIG. 15 -->
                <ProcBase Name="Gauss 3d filter Gauss -> Gauss[21,1] if
                -/* " bLoopChg="0" iMaxCycle="1" bExpand="1" bActive="1"
                bAutoName="1" bSubrtn="0" sComment="">
                  <LensInfo sLensId="" sPwd=""></LensInfo>
                  <Algorithm guid="289CAEF4-C86B-4e76-9130-
                  F874E1654EDE">
                  + <Params>
                  </Params>
```

FIG. 32B

```xml
        </Algorithm>
        <Domain>
        <ProcDmnPxlLvl>
          <ProcDomain sThmLayer="" iNumMaxObj="0"
          iVersion="4">
            <mClssFltr eState="0" bUnclsfy="0"
            bUseDmnTxt="1"></mClssFltr>
          </ProcDomain>
        </ProcDmnPxlLvl>
        </Domain>
        <SubProc></SubProc>
      </ProcBase>
      <!-- Below is a process step shown below item 105 in
      FIG. 15 that takes 0.711 seconds -->
    + <ProcBase Name="Diff center to mean 3d filter Gauss ->
      Gauss[ 21,1] if -/+" bLoopChg="0" iMaxCycle="1"
      bExpand="1" bActive="1" bAutoName="1" bSubrtn="0"
      sComment="">
      <!-- Below is a process step for generating a thematic
      layer; See, e.g., item 107 in FIG. 17 -->
      <ProcBase Name="* them layer[ A#1,X(1),A#4]" bLoopChg="0"
      iMaxCycle="1" bExpand="1" bActive="1" bAutoName="1"
      bSubrtn="0" sComment="">
        <LensInfo sLensId="" sPwd=""></LensInfo>
        <Algorithm guid="{A86279C6-B8CE-4638-A882-
        63A070CDD770}">
      + <Params>
        </Algorithm>
        <Domain>
      + <ProcDmnPxlLvl>
        </Domain>
        <SubProc></SubProc>
      </ProcBase>
      <!-- Below is a process step shown below item 107 in
      FIG. 17 listed after "00:07" -->
    + <ProcBase Name="Num. darker 3d filter Gauss ->
      Gauss[ 21,1] if them layer/A#4" bLoopChg="0"
      iMaxCycle="1" bExpand="1" bActive="1" bAutoName="1"
      bSubrtn="0" sComment="">
      <!-- Below is a process step shown below item 107 in
      FIG. 17 listed after "00:05" -->
    + <ProcBase Name="Gauss 3d filter Gauss -> Gauss[ 21,1] if
      them layer/A#4" bLoopChg="0" iMaxCycle="1" bExpand="1"
      bActive="1" bAutoName="1" bSubrtn="0" sComment="">
      <!-- Below is a process step shown below item 107 in
      FIG. 17 that takes 0.801 seconds -->
    + <ProcBase Name="* them layer[ A#1,X(1),A#4]" bLoopChg="0"
      iMaxCycle="1" bExpand="1" bActive="1" bAutoName="1"
      bSubrtn="0" sComment="">
      <!-- Below is a process step shown above item 109 in
      FIG. 18 that takes 0.13 seconds -->
    + <ProcBase Name="density filter them layer[ 1 to 9 pixels
      "X#1|A#1" next(3) to A#4]" bLoopChg="0"
      iMaxCycle="1" bExpand="1" bActive="1" bAutoName="1"
      bSubrtn="0" sComment="">
      <!-- Below is a process step for expanding a thematic
      layer; See, e.g., item 109 in FIG. 18 -->
      <ProcBase Name="4x: grow them layer/A#5 into X#1 if
      density>2/0, fill with A#4" bLoopChg="0" iMaxCycle="4"
      bExpand="1" bActive="1" bAutoName="1" bSubrtn="0"
      sComment="">
        <LensInfo sLensId="" sPwd=""></LensInfo>
        <Algorithm guid="07F6D0AE-18C7-45dd-9869-
        65CC949AF5E3">
      + <Params>
```

FIG. 32C

```
                    </Algorithm>
                    <Domain>
                  + <ProcDmnPxlLvl>
                    </Domain>
                    <SubProc></SubProc>
                  </ProcBase>
                </SubProc>
              </ProcBase>
            + <ProcBase Name="image full" bLoopChg="0" iMaxCycle="1"
              bExpand="0" bActive="1" bAutoName="0" bSubrtn="0"
              sComment="">
                + <ProcBase Name="copy them layer[ 631.5,0;631.5,635.5] to
                  them layer[ 0,0;-1,-1] " bLoopChg="0" iMaxCycle="1"
                  bExpand="1" bActive="1" bAutoName="1" bSubrtn="0"
                  sComment="">
                + <ProcBase Name="density filter them layer[ 1 to 9 pixels
                  "A#1" next(3) to A#4] " bLoopChg="0"
                  iMaxCycle="1" bExpand="1" bActive="1" bAutoName="1"
                  bSubrtn="0" sComment="">
                + <ProcBase Name="2x: grow them layer/A#5 into X#1|A#1 if
                  density>37/81, fill with A#4" bLoopChg="0"
                  iMaxCycle="2" bExpand="1" bActive="1" bAutoName="1"
                  bSubrtn="0" sComment="">
    <ProcBase Name="for all" bLoopChg="0" iMaxCycle="1" bExpand="0"
    bActive="1" bAutoName="1" bSubrtn="0" sComment="">
      <LensInfo sLensId="" sPwd=""></LensInfo>
      <Algorithm guid="A8BA5775-CC39-4194-9A6A-A64872EE1F81">
        <Params></Params>
      </Algorithm>
    + <Domain>
      <SubProc>
      + <ProcBase Name="chess board: 10000 creating 'nuclei'"
        bLoopChg="0" iMaxCycle="1" bExpand="1" bActive="1" bAutoName="1"
        bSubrtn="0" sComment="">
      + <ProcBase Name="at nuclei: assign class using them layer 'them
        layer'[membership=1.000000]" bLoopChg="0" iMaxCycle="1"
        bExpand="1" bActive="1" bAutoName="1" bSubrtn="0" sComment="">
    <!-- Below are process steps for object-oriented processing -->
    <ProcBase Name="O-processing" bLoopChg="0" iMaxCycle="1" bExpand="0"
    bActive="1" bAutoName="0" bSubrtn="0" sComment="">
      <LensInfo sLensId="" sPwd=""></LensInfo>
      <Algorithm guid="A8BA5775-CC39-4194-9A6A-A64872EE1F81">
        <Params></Params>
      </Algorithm>
      <Domain>
        <ProcDomain sThmLayer="" iNumMaxObj="0" iVersion="4">
          <mClssFltr eState="0" bUnclsfy="0" bUseDmnTxt="1"></mClssFltr>
        </ProcDomain>
      </Domain>
      <SubProc>
      + <ProcBase Name="A#5 at nuclei: chess board: 1" bLoopChg="0"
        iMaxCycle="1" bExpand="1" bActive="1" bAutoName="1" bSubrtn="0"
        sComment="">
      + <ProcBase Name="loop: A#4 at nuclei: <- A#5" bLoopChg="1"
        iMaxCycle="1" bExpand="1" bActive="1" bAutoName="1" bSubrtn="0"
        sComment="">
      + <ProcBase Name="loop: A#5 at nuclei: merge region" bLoopChg="1"
        iMaxCycle="1" bExpand="1" bActive="1" bAutoName="1" bSubrtn="0"
        sComment="">
    + <ProcBase Name="processing by linking" bLoopChg="0" iMaxCycle="1"
    bExpand="1" bActive="1" bAutoName="0" bSubrtn="0" sComment="">
        <!-- Below is a process step shown at the bottom of the process
        hierarchy in FIG. 19 for assigning an object class "A#4" to pixel
        values associated with nuclei -->
```

FIG. 32D

```
<ProcBase Name="A#4 at nuclei: for all" bLoopChg="0" iMaxCycle="1"
    bExpand="1" bActive="1" bAutoName="1" bSubrtn="0" sComment="">
  <LensInfo sLensId="" sPwd=""></LensInfo>
  <Algorithm guid="A8BA5775-CC39-4194-9A6A-A64872EE1F81">
    <Params></Params>
  </Algorithm>
  +<Domain>
    <ProcDmnFtrLvl>
      <ProcDomain sThmLayer="" iNumMaxObj="0" iVersion="4">
        <mClssFltr eState="2" bUnclsfy="0" bUseDmnTxt="1">
126─┤    <lClss>
          <DListInt>
            <int value="31"></int>
          </DListInt>
        </lClss>
      </mClssFltr>
    </ProcDomain>
    <MapLvlProxy strName="nuclei" MapLvl="1">
      <Scope GUID="00000000-0000-0000-0000-000000000000"></Scope>
    </MapLvlProxy>
  </ProcDmnFtrLvl>
  </Domain>
  <SubProc>
   +<ProcBase Name="_LINK 2(in/out) links within dist=0: _marked"
      bLoopChg="0" iMaxCycle="1" bExpand="1" bActive="1" bAutoName="1"
      bSubrtn="0" sComment="">
  +<ProcBase Name="at nuclei: delete all(in/out) links to any with
     class=any" bLoopChg="0" iMaxCycle="1" bExpand="1" bActive="1"
     bAutoName="1" bSubrtn="0" sComment="">
   +<ProcBase Name="determine quality" bLoopChg="0" iMaxCycle="1"
      bExpand="0" bActive="1" bAutoName="0" bSubrtn="0" sComment="">
  <!-- Below is a process step shown at the bottom of the process hierarchy
  in FIG. 20 that takes 0.14 seconds -->
  <ProcBase Name="A#4 at nuclei: export object statistics" bLoopChg="0"
    iMaxCycle="1" bExpand="1" bActive="1" bAutoName="1" bSubrtn="0"
    sComment="">
    <LensInfo sLensId="" sPwd=""></LensInfo>
   +<Algorithm guid="2BB99370-74DE-4644-B0BB-2266DD301824">
    </Algorithm>
   +<Domain>
    <SubProc></SubProc>
  </ProcBase>
  </SubProc>
  </ProcBase>
  </ProcessList>
 +<ExportedItems>
  </ExportedItems>
  <LensIds></LensIds>
  <Behaviour>
   <DistCalc mode="SER"></DistCalc>
  </Behaviour>
  <MetaDataConversion>
    <MetaDataAlias>
      <Names></Names>
      <Values></Values>
    </MetaDataAlias>
    <MetaDataValues></MetaDataValues>
  </MetaDataConversion>
</eCog.Proc>
```

FIG. 32E

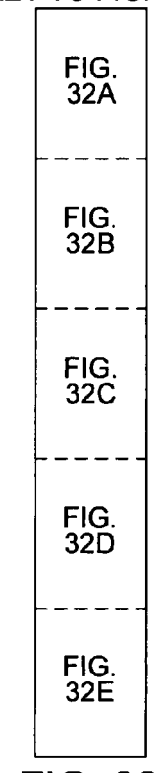

KEY TO FIG. 32

ANALYZING PIXEL DATA USING IMAGE, THEMATIC AND OBJECT LAYERS OF A COMPUTER-IMPLEMENTED NETWORK STRUCTURE

CROSS REFERENCE TO RELATED APPLICATION

This application is a continuation in part of, and claims priority under 35 U.S.C. §120 from, nonprovisional U.S. patent application Ser. No. 11/511,930 entitled "Cognition Integrator and Language," filed on Aug. 28, 2006. Application Ser. No. 11/511,930 in turn is a continuation of, and claims the benefit under 35 U.S.C. §119 from, German Application No. 102 48 013.3, filed on Oct. 15, 2002, in Germany, and from German Application No. 10 2005 016 290.8, filed on Apr. 8, 2005, in Germany. The subject matter of each of the foregoing documents is incorporated herein by reference.

TECHNICAL FIELD

The present invention relates generally to analyzing target patterns in digital images, and more specifically to a computer-implemented system for detecting and measuring those target patterns.

CROSS REFERENCE TO COMPACT DISC APPENDIX

The Compact Disc Appendix, which is a part of the present disclosure, is one recordable Compact Disc (CD-R) containing information that is part of the disclosure of the present patent document. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

BACKGROUND

Various systems have been developed for detecting and analyzing target patterns in digital images. A digital image is a rectangular array of pixels. Each pixel is characterized by its position in the array and a plurality of numerical pixel values associated with the pixel. The pixel values represent color information for various image layers. For example, grayscale digital images are represented by a single image layer, whereas RGB true-color images are represented by three image layers. In biological analysis using fluorescence markers, there are as many image layers as there are discrete laser frequencies. Consequently, a digital image acquired by a fluorescence microscope includes a plurality of pixel values associated with each pixel location. Some existing analysis systems apply semantic networks to analyze the contents of the digital images. Systems that apply semantic networks perform object-oriented picture analysis, as opposed to solely statistical pixel-oriented analysis. Consequently, semantic network systems classify not only pixels, but also data objects linked to the pixels. The data objects that are linked to the pixels and to one another represent measurable information about the digital images.

Although object-oriented analysis can provide better results than pixel-oriented analysis alone, object-oriented analysis is also more computationally involved. Therefore, object-oriented analysis is often slower than statistical pixel-oriented analysis-alone.

A method is sought that retains the advantages of object-oriented analysis, yet enhances the performance of analysis systems based on computer-implemented semantic networks. Such a method would efficiently manage the computational resources of the object-oriented analysis systems.

SUMMARY

An analysis system for digital images segments acquired pixel values into various data representations, including image layers, thematic layers and object layers. The object layers of an hierarchical object network, the image layers of pixel values and the thematic layers of thematic classes together form a data network of a computer-implemented network structure. The computer-implemented network structure also includes a process hierarchy of process steps and a class network of object classes. In an iterative analysis process, the pixel values, thematic classes, objects, object classes and process steps are linked and re-linked to each other to generate the network structure. Objects, object classes and process steps are sometimes called "nodes".

Various types of processing are performed depending on whether the data contained in the digital image is represented in the image layers, the thematic layers or the object layers. The processing involves segmentation (S) of data in the image layers (L), object-layers (O), and thematic-layers (T). Thus, the processing performed by the analysis system is called "SLOT" processing. SLOT processing combines the three aforementioned processing types to segment the acquired input data into the three data representations that are linked by the analysis system to each other in a meaningful way.

Each of the three aforementioned processing types is used when that particular processing type produces the most efficient results. The analysis system performs numerical and statistical processes primarily on the image layers. Basic semantic operations are performed on the thematic layers, and full semantic processing is performed on the objects layers. Digital images are most efficiently analyzed by enabling the image, object and thematic layers to communicate with each other. Preliminary results from one layer are then used to determine which sub-set of data in another layer is processed and how that sub-set of data is processed.

The generation of the three layers is synchronized so that each layer influences the other two. Thus, the processing in any one layer is based on the previous results of processing in one of the other two layers. There are six combinations of SLOT processing: (1) image to thematic layer, (2) image to object layer, (3) thematic to image layer, (4) thematic to object layer, (5) object to thematic layer, and (6) object to image layer.

For example, the filter parameters applied to a pixel value of an image layer are determined based on the thematic class assigned to the pixel value, based on the object class of the object to which the pixel value is linked, or are based on a characteristic determined from the object to which the pixel value is linked. A Gaussian filter may blur the distinction between the brightness of a pixel and its neighboring pixels more when the pixel is linked to a larger object. In a second example, a thematic-layer process, such as expanding into a neighboring thematic class, is performed only at pixel locations for which the corresponding pixel values on an image layer exceed a specified brightness threshold. In a third example, a segmentation process of objects in a layer of an object network is performed using only pixel values of an image layer whose brightness falls below a specified brightness threshold. In a fourth example, a filter is applied to thematic classes of a thematic layer only at pixel locations corresponding to pixel values that are linked to an object of the object network.

In one embodiment, the user of the analysis system first specifies an object class and a filter. After the analysis system acquires first pixel values of a first image layer, the analysis system generates a first object network that includes a first plurality of objects. Some of the first pixel values are linked to each of the first plurality of objects, and each of the first plurality of objects is linked to the object class. The analysis system then generates a second image layer of filtered pixel values by applying the filter to each of the first pixel values that is linked to one of the first plurality of objects. The first image layer is overwritten by the second image layer in the memory space originally occupied by the first image layer. A second object network is then generated by linking some of the filtered pixel values to each of a second plurality of objects. The second object network is formed by substituting the second plurality of objects for the first plurality of objects in the first object network. One of the second plurality of objects is then measured to determine a characteristic, such as area, circumference and longest dimension.

In another embodiment, the user of the analysis system first specifies an object class and a thematic class. After the analysis system acquires first pixel values of a first image layer, the analysis system generates a second image layer of second pixel values by filtering the first pixel values of the first image layer. The second image layer is formed when the first pixel values of the first image layer are overwritten by the second pixel values. The analysis system then generates a thematic layer by assigning the thematic class to certain of the second pixel values. Then a third image layer of third pixel values is generated by processing those second pixel values that are classified as belonging to the thematic class, and the second pixel values are overwritten by the third pixel values. The analysis system then uses the third pixel values to generate an object network that includes an object belonging to the specified object class. Certain of the third pixel values are linked to the object. The object is then measured to determine one of its characteristics.

In yet another embodiment, the user specifies an object class, a first algorithm and a second algorithm. After the analysis system acquires pixel values of a first image layer, the analysis system generates a second image layer by filtering the pixel values. The analysis system then generates an object network by linking a plurality of the filtered pixel values to the object. A thematic layer is then generated by assigning thematic classes to the filtered pixel values. The analysis system then uses the first algorithm to process those filtered pixel values of the second image layer that belong to specific thematic classes. In addition, the analysis system uses the second algorithm to process the plurality of the filtered pixel values of the second image layer that are linked to the object.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 31 is a listing of high-level lines of XML code corresponding to a script that generates the computer-implemented network structure that detects nuclei according to the steps shown in FIGS. 21-27.

FIGS. 32A-E show more lines of the XML code of FIG. 31.

DETAILED DESCRIPTION

Figure 1:
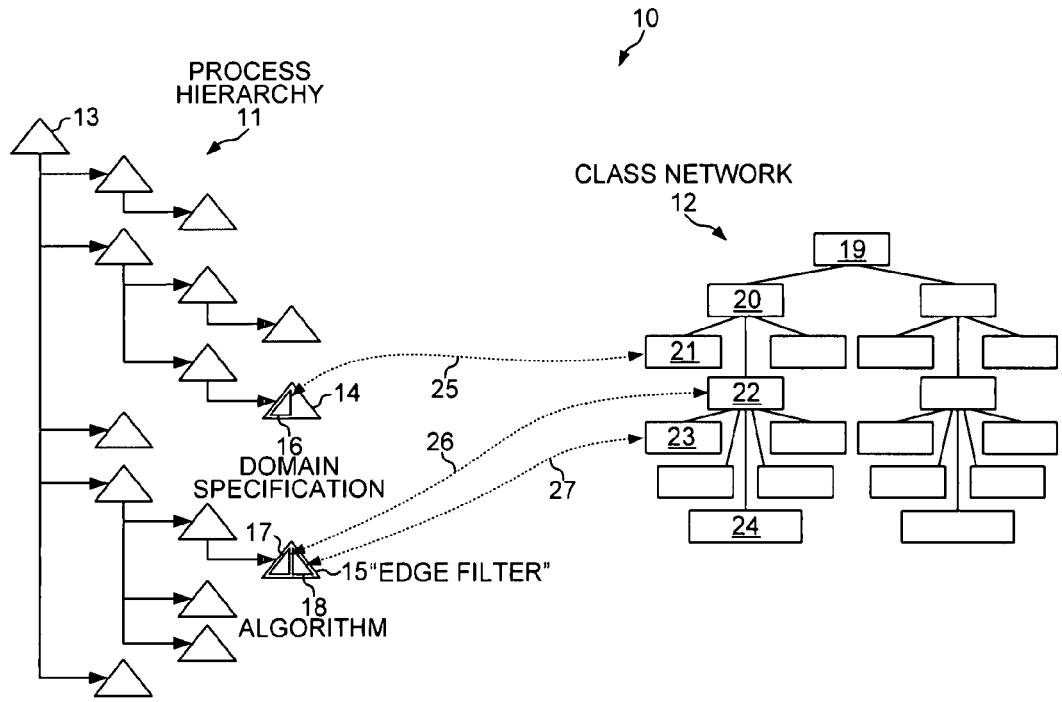
FIG. 1 is a simplified schematic diagram of a computer-implemented network structure that includes a class network and a process hierarchy.

Reference will now be made in detail to some embodiments of the invention, examples of which are illustrated in the accompanying drawings.

An analysis system analyzes and measures patterns present in the pixel values of digital images using a computer-implemented network structure. The network structure includes a process hierarchy, a class network and a data network. The data network represents information associated with each pixel location in the form of image layers, thematic layers and object networks. The analysis system performs both pixel-oriented processing and object-oriented processing by using that combination of data representations that yields the fastest result. Pixel-oriented and object-oriented processing is combined so that fewer computations and less memory are used to analyze an acquired digital image.

The data network includes image layers of pixel values associated with pixel locations that are linked to objects of object networks. Each object network has various layers of objects (also called object "levels"). The objects of the data network are classified into classes of the class network. The data network also includes thematic layers. Thematic layers are used in combination with the image layers and the object networks to analyze digital images. There is a one-to-one relationship between a pixel location and the thematic class of a thematic layer. For example, in one application, operations are performed on the pixel values associated with an object depending on the thematic class linked to each pixel location that is linked to the object. The analysis system can also, however, analyze digital images without using thematic layers.

In a specification mode and before the pixel values are acquired, the user of the analysis system specifies the class network and the process hierarchy. The classes of the class network describe categories of objects that the user expects to find in the digital image. The user also specifies thematic classes that describe categories of pixel values. The process hierarchy describes how the digital image is to be analyzed in order to find a target object. The process hierarchy defines the process steps performed on the pixel values and objects. In the specification mode, the user also specifies types of links that are to connect process steps, classes and objects of the data network to each other. A link between two nodes describes the relationship between the two nodes.

In an execution mode, the analysis system performs the process steps on the acquired pixel values. By performing the process steps, pixel locations associated with particular pixel values are linked to objects, and the objects are categorized as belonging to specific classes of the class network. Pixel locations associated with particular pixel values are also categorized as belonging to one of the thematic classes. The analysis system links the process steps, classes and objects to each other in a manner that enables the analysis system to detect a target object that is defined by a class. For example, the analysis system can recognize where a predefined pattern occurs in the digital image.

FIG. 1 illustrates a computer-implemented network structure 10 of the analysis system in the specification mode after the user has specified a process hierarchy 11 and a class network 12. The user specifies not only the individual process steps of process hierarchy 11, but also the order in which the process steps are to be executed in the execution mode. Thus, process hierarchy 11 has a root process step 13 linked to other process steps. The process steps in turn may be linked to substeps, such as substeps 14 and 15. Each process step includes a domain specification and an algorithm. The domain specifies the classes whose associated objects will be operated upon by the algorithm in the execution mode at run time. For example, process step 14 includes a domain specification 16. And process step 15 includes a domain specification 17 and an algorithm 18. Algorithm 18 operates on the objects specified in domain 17. The user can choose preformulated algorithms from a database of algorithms accessed by the analysis system. For example, some algorithms are used for the segmentation of objects. Other algorithms are used for computation, such as for statistical calculations or to calculate the area of pixel locations linked to an object.

In this example, the user has specified various classes and subclasses of class network 12 in the specification mode. The user starts by giving each class and subclass a name. Class network 12 includes a tissue class 19, a cell class 20, a cell wall subclass 21, a nucleus subclass 22, a nuclear wall subclass 23 and a chromosome subclass 24. Each class has an associated membership function that defines the probability that an object of the data network will belong to the particular class. The membership functions do not define whether an individual pixel location belongs to a class. Rather, each object is a group of pixel locations linked to the object, and the user specifies the membership function by defining the properties that the object must have to belong to the class. Examples of such properties include the area, shape, color and texture of the object. The area of an object may be determined, for example, by the number of pixel locations linked to the object.

FIG. 1 shows that a link 25 associates domain specification 16 with subclass 21 (cell wall). A link 26 associates domain specification 17 with subclass 22 (nucleus). The user has also specified a link 27 between algorithm 18 and subclass 23 (nuclear wall). For example, algorithm 18 determines the area of the objects that belong to subclass 22 (nucleus) in part using the objects linked to subclass 23 (nuclear wall).

In the execution mode, the analysis system acquires pixel values of digital images. A pixel value is generated by an imaging device at each pixel location. In the medical field, imaging devices include X-ray devices, a computed tomography devices (CT), ultrasound imaging devices, and magnetic resonance imaging (MRI) devices. The digital pixel values indicate the grey levels (brightness) in the space domain of the digital image. At run time in the execution mode, the analysis system executes the process steps as specified in process hierarchy 11 and generates a data network.

Figure 2:
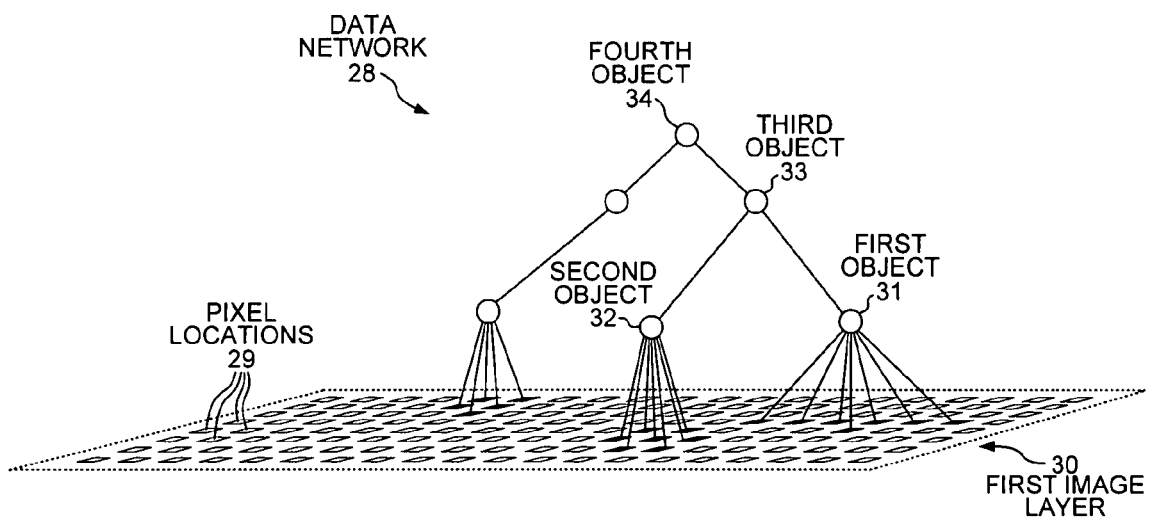
FIG. 2 is a simplified schematic diagram of a data network of the computer-implemented network structure of FIG. 1.

FIG. 2 shows a data network 28 generated in the execution mode by selectively linking pixel locations 29 from the digital image to objects according to process hierarchy 11 and class network 12. Pixel values associated with the pixel locations 29 form a first image layer 30. In this example, analysis system operates on the digital pixel values from a medical image of a patient. Data network 28 includes a first object 31, a second object 32, a third object 33 and a fourth object 34. First object 31 and second object 32 are generated by linking to the object those pixel locations associated with pixel values having similar characteristics, such as brightness. Thresholds of brightness at pixel locations that are grouped together can be obtained from a histogram of the pixel values in the digital image. The objects are then linked together into classes according to the membership functions of the classes. While the classes of class network 12 describe what the user expects to find in the digital image, the objects represent concrete instances of those classes that are actually detected by the analysis system. Each object is linked to a set of pixel locations whose associated pixel values are determined by the visual appearance of the object as measured by the image acquisition device.

Figure 3:
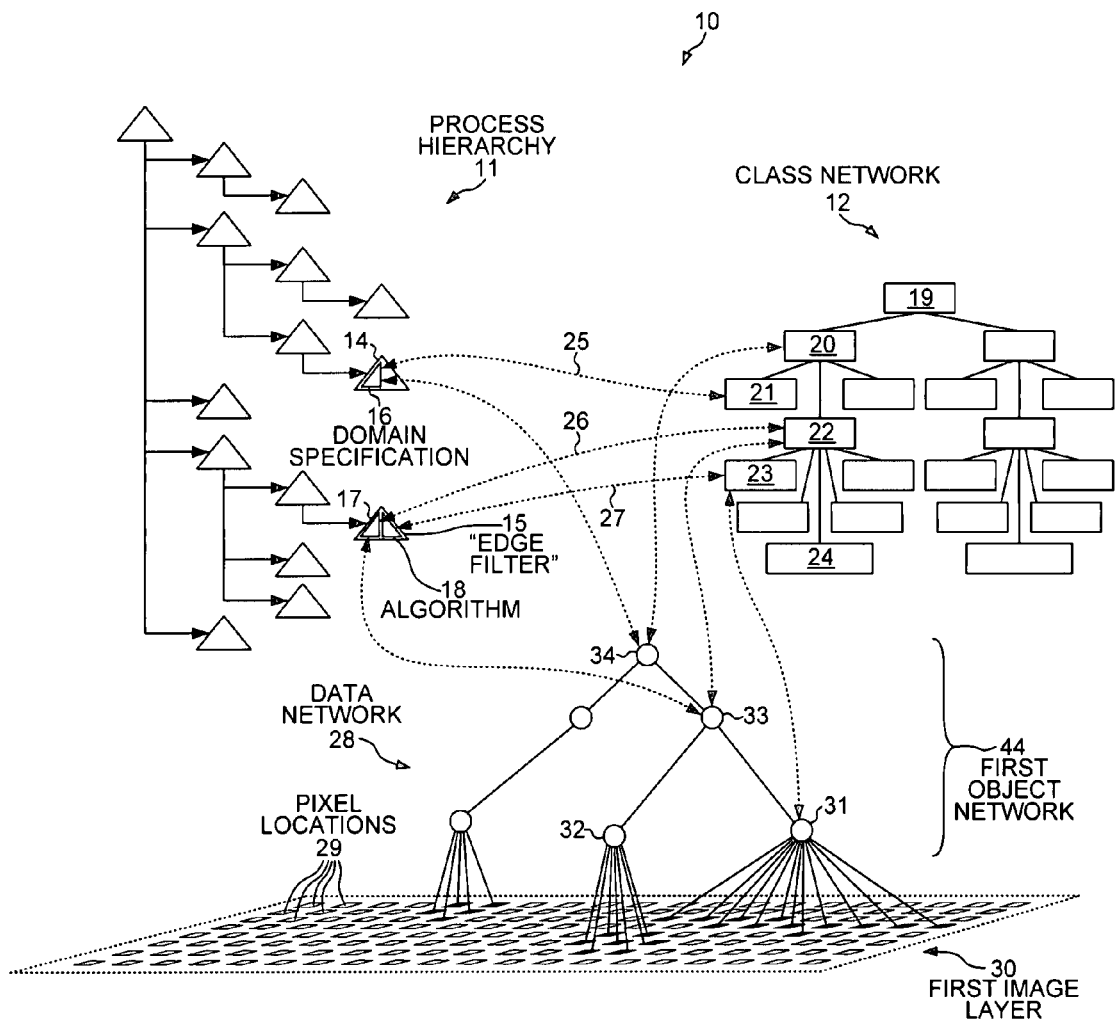
FIG. 3 is a simplified schematic diagram of the computer-implemented network structure of FIGS. 1 and 2 showing links between the data network, the class network and the process hierarchy.

FIG. 3 shows how process hierarchy, class network 12 and data network 28 are interlinked at run time to generate computer-implemented network structure 10. At run time, classes and process steps are linked to objects. In this example, network structure 10 helps a doctor to recognize cancerous regions in tissue that is being inspected.

Object-oriented image analysis can better recognize patterns in complex digital images than can pure pixel-oriented statistical processing. But object-oriented processing is computationally more intensive and therefore slower than pure statistical processing. The more accurate pattern recognition of object-oriented image analysis can be retained, while at the same time reducing the amount of computations required, by combining object-oriented and pixel-oriented processing. For example, an object in a digital image can be analyzed by performing statistical processing only on pixel values associated with pixel locations that are linked to specific objects of an object network.

Figure 4:
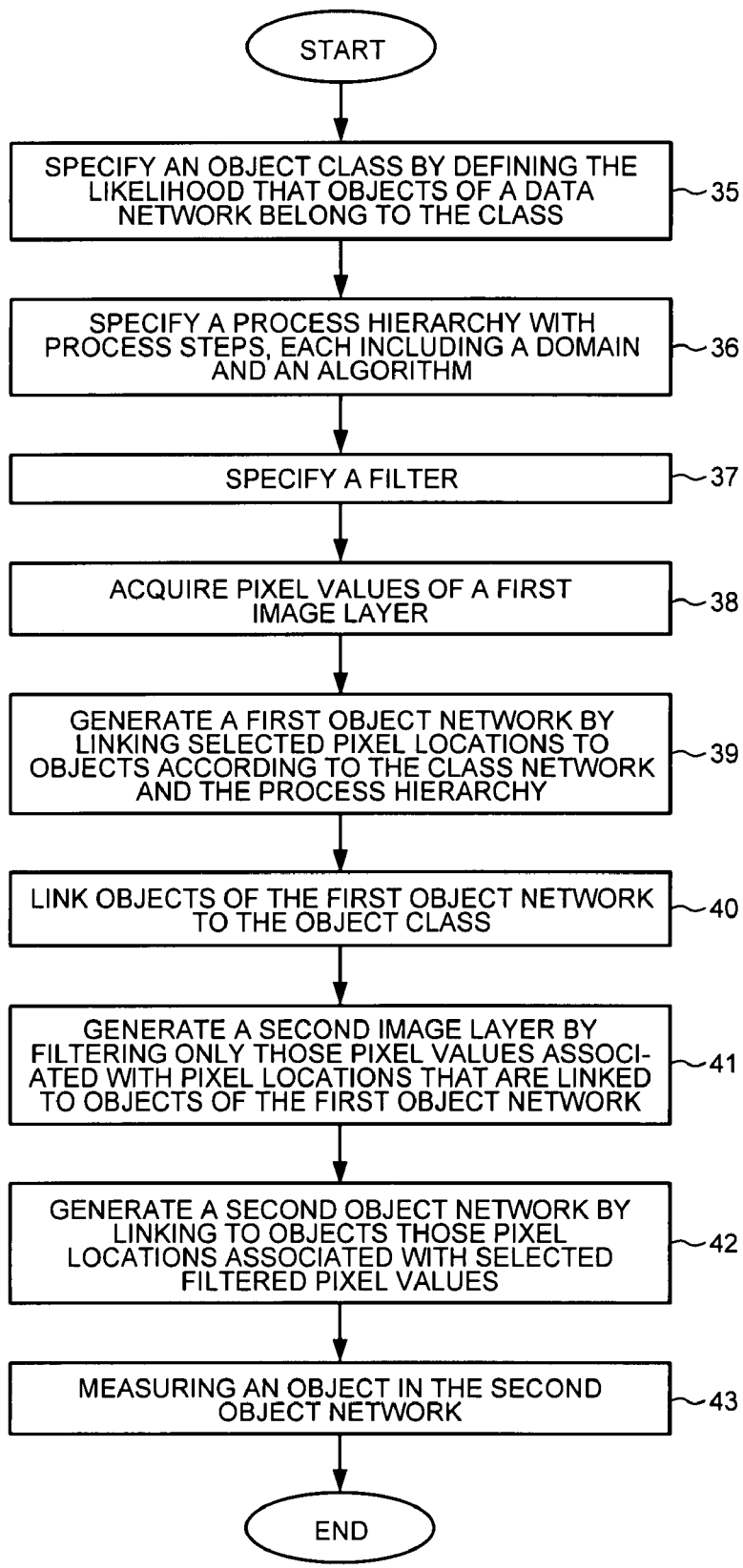
FIG. 4 is a flowchart of steps for performing computer-aided detection of target regions in digital images using the computer-implemented network structure of FIG. 3. The detection is performed by filtering only those pixel values that are linked to specific objects of an object network.
Figure 5:
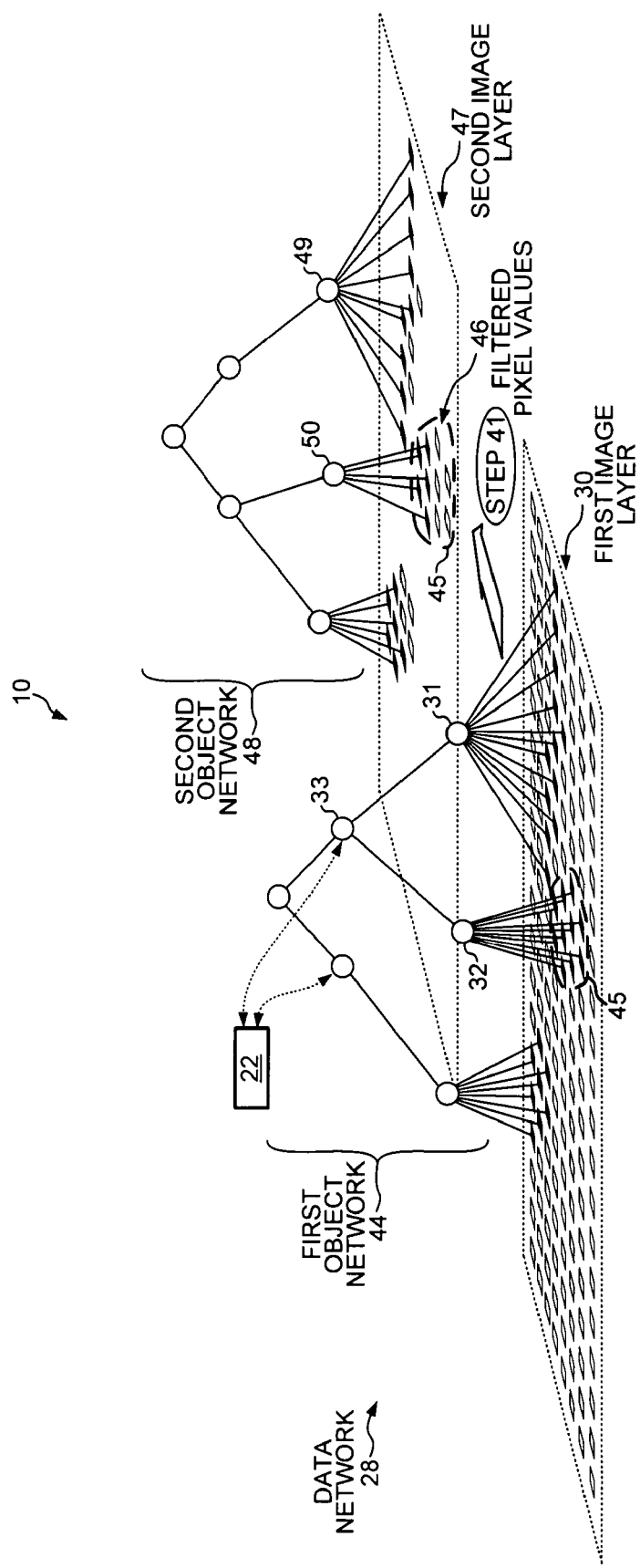
FIG. 5 is a simplified schematic diagram of the image layers and object networks of a network structure used to perform the method of FIG. 4 by processing only a subset of the pixels of an image layer.

FIG. 4 is a flowchart illustrating steps 35-43 of a method by which the analysis system performs computer-aided detection (CAD) of target regions in digital images that depict nuclei in cancerous human cells. The method of FIG. 4 analyzes a digital image by performing filtering only those pixel values associated with pixel locations that are linked to specific objects of an object network. The steps of FIG. 4 will now be described in relation to the operation of network structure 10 as shown in FIGS. 3 and 5.

In first step 35, a user of the analysis system specifies class network 12 by defining the likelihood that objects of data network 28 will belong to each particular class of class network 12. The user of the analysis system is, for example, a research doctor who is applying his expert knowledge to train the analysis system in the specification mode.

In step 36, the user specifies process hierarchy 11. The user specifies not only the individual process steps, but also the order in which the process steps are to be executed in the execution mode. In this example, the user has specified process steps including sub-process step 15 named "Filter Edge". Sub-process step 17 includes algorithm 18 that operates on domain 17.

In step 37, the user specifies a filter. In this example, algorithm 18 of sub-process step 17 applies an edge filter to find nuclear walls of cells. In step 37, the user specifies the parameters of the filter. An example of a filter parameter is the size of the object to be filtered. The size can be defined as the border length of the object or the diameter of the object, measured in pixel units.

In step 38, the analysis system acquires the pixel values of first image layer 30.

In step 39, the analysis system runs in the execution mode and generates data network 28 by selectively linking pixel locations 29 to objects according to the class network and the process hierarchy. Data network 28 is generated when the analysis system executes the process steps as specified in process hierarchy 13. Each object is generated by linking to the object pixel locations associated with pixel values having similar characteristics. For purposes of illustration, FIG. 3 shows that first object 31 is linked to twelve pixel locations associated with pixel values having similar characteristics. The objects linked to one another form a first object network 44.

In step 40, each of the objects of first object network 44 is linked to the associated object class of class network 12. For example, first object 31 is linked to subclass 23 (nuclear wall), and third object 33 is linked to subclass 22 (nucleus).

In step 41, a new image layer is generated by performing pixel-oriented processing only on those pixel values of first image layer 30 whose pixel locations are linked to specific objects of first object network 44. In this manner, the computations required to analyze target patterns in the digital image are reduced, and the speed at which the patterns are recognized and measured is increased.

FIG. 5 illustrates how pixel-oriented processing is performed only on a subset of the pixel values in first image layer 30. In this example, the edge filter of algorithm 18 of sub-process step 15 of FIG. 3 is applied only to those pixel values whose pixel locations are linked to objects ultimately linked to the object class 19 (tissue). Thus, the edge filter is not applied to background pixels. For example, the edge filter is applied to the pixel values associated with pixel locations linked to second object 32 in pixel region 45. The filtered pixel values 46 associated with pixel locations within pixel region 45 then form part of a second image layer 47.

In one embodiment, second image layer 47 is not an entirely new image layer. Instead, second image layer 47 is first image layer 30 with pixel values modified only in the filtered regions, such as pixel region 45. Thus, in pixel region 45, the pixel values of first image layer 30 are overwritten with the filtered pixel values 46. Memory is saved in computer-implemented network structure 10 by not generating an entirely new second image layer 47. Second image layer 47 uses the same memory space as first image layer 30. In a second embodiment, second image layer 47 is created in an entirely new memory space. Although this second embodiment requires more memory, the results of the various sub-process steps are saved and can be viewed on the graphical user interface of the analysis system and used to optimize the performance of the pattern detection method. In a similar manner, earlier processing versions of the object network are overwritten with later versions in the same memory space in one embodiment. In other embodiments that require more memory, the various processing versions of the object network are retained and stored in multiple memory spaces.

In step 42, the analysis system then generates a second object network 48 by selectively linking pixel locations associated with filtered pixel values 46 to objects according to the class network and the process hierarchy. FIG. 5 shows that objects 49 and 50 of second object network 48 are linked to pixel locations associated with filtered pixel values 46 that are not identical to the pixel locations linked to first object 31 and second object 32. As explained above, the objects (nodes) of second object network 48 that are unchanged compared to the corresponding objects of first object network 44 are stored unchanged in the same memory location. The unchanged objects are not copied into new memory spaces. Objects that have been modified, such as objects 49 and 50, are overwritten into the memory locations previously occupied by objects 31 and 32, respectively. Thus, in one embodiment, there is only one memory space for the object network of the method of FIG. 4. This saves memory.

In step 43, an object of second object network 48 is measured. For example, the length of the nuclear wall represented by object 49 is measured as the number of contiguous pixel locations that make up a one-pixel wide nuclear wall. By filtering out pixel values, the edge filter applied in step 41 removed pixel locations from first object 31 that formed a nuclear wall more than one pixel wide, thereby simplifying the measurement of the length of the nuclear wall of object 49 of second object network 48.

Figure 6:
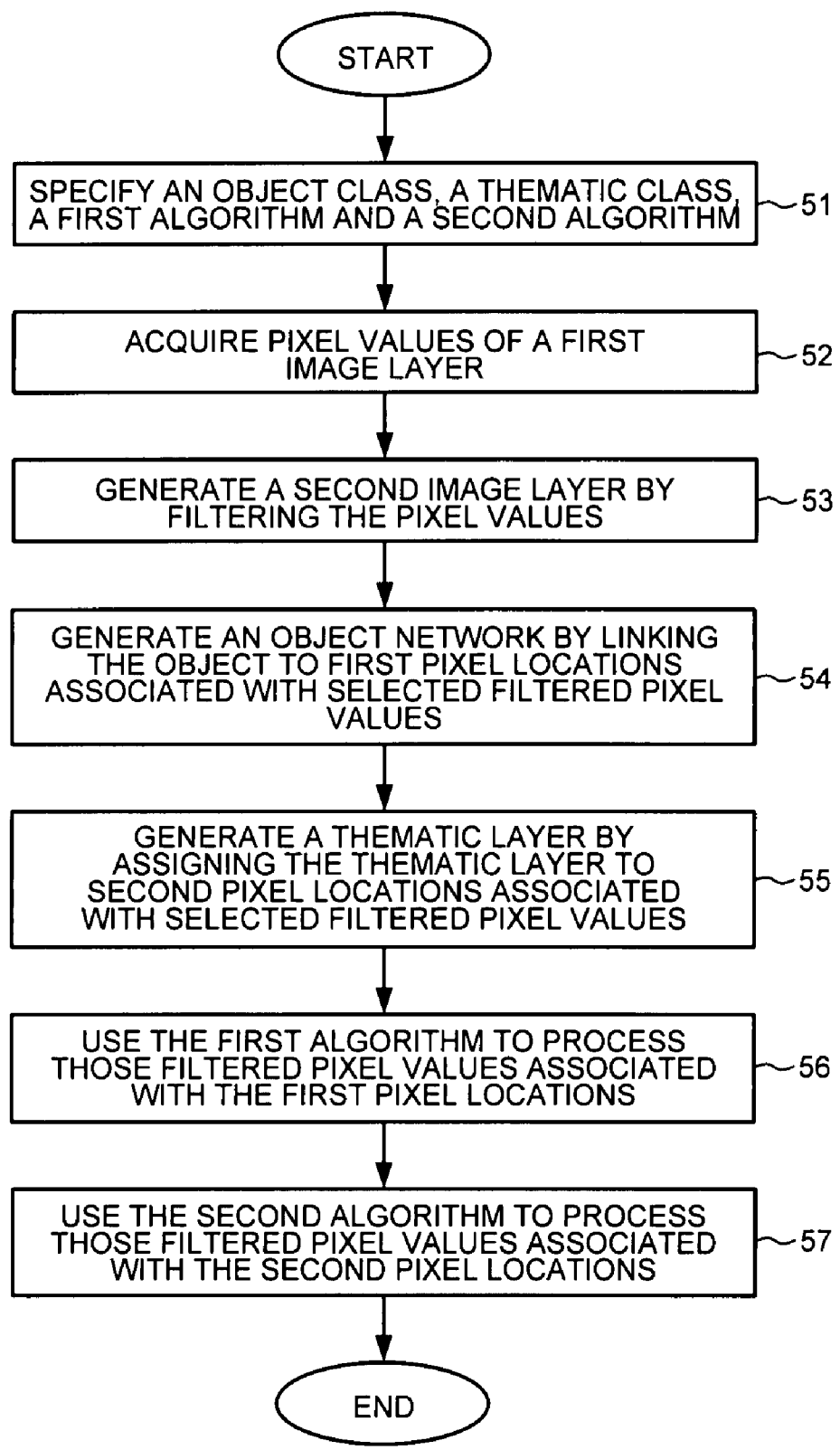
FIG. 6 is a flowchart of steps for detecting target patterns by using a network structure to filter only those pixel values of an image layer that have a specific thematic class.

FIG. 6 is a flowchart illustrating steps 51-57 of a method by which the analysis system detects target regions in a digital image using thematic layers derived from image layers. The method of FIG. 6 analyzes the digital image by filtering only those pixel values of an image layer that are associated with pixel locations assigned to a specific thematic class. Then, only those pixel values are filtered that are associated with pixel locations linked to an object. The steps of FIG. 6 will now be described in relation to the operation of network structure 10 of FIG. 7.

In first step 51, the user specifies the classes of class network 12 as well as thematic classes. The user also specifies a first algorithm and a second algorithm of process steps of process hierarchy 11.

In step 52, the analysis system acquires pixel values of first image layer 30. Each of the pixel locations 29 is associated with an acquired pixel value. For example, a pixel location corresponds to a memory location in which an acquired digital pixel value is stored.

In step 53, the analysis system generates a second image layer 58 by filtering all of the pixel values of first image layer 30. This differs from step 41 of the method of FIG. 4, in which second image layer 47 was generated by filtering only those pixel values that were associated with pixel locations linked to objects. Second image layer 58 is composed of filtered pixel values 59. For example, a Gaussian filter is applied to pixel values of first image layer 30 and blurs the distinctions between the filtered pixel values 59 of second image layer 58. The pixel locations 29 labeled on first image layer 30 refer to the same pixel locations 29 labeled on second image layer 58. Thus, one pixel location is associated with multiple pixel values, one for each image layer that the analysis system generates.

In step 54, the analysis system generates an object network 60 by selectively linking objects to pixel locations 29 associated with filtered pixel values 59 of second image layer 58 according to process hierarchy 11 and class network 12. For example, FIG. 7 shows that an object 61 is linked to eleven pixel locations within a pixel region 62 that are associated with filtered pixel values 59.

In step 55, the analysis system generates a thematic layer by assigning thematic classes to each of the pixel locations 29 associated with filtered pixel values 59. There is a one-to-one relationship between each pixel location and a class of thematic layer 63. Because the thematic class of each pixel location depends only on the characteristics of an associated pixel value, such as brightness, thematic layer 63 can be used for pixel-oriented processing. On the other hand, object-oriented processing is more complex and depends on whether a pixel location is linked to an object. For example, whether a pixel location is linked to an object can depend on the shape or size of the object that would result if the pixel location were included in the object. Moreover, whether a pixel location is linked to an object can also depend on the average brightness of all of the pixel values associated with the object that would result if the particular pixel location were to be included in the object. In contrast, whether a pixel location is linked to a thematic class does not depend on the characteristics of the pixel values associated with any other pixel location. Because the thematic classification of a pixel location does not depend on the characteristics of pixel values of any other pixel locations, the generation of thematic layer 63 is fast and is not computationally intensive.

Figure 7:
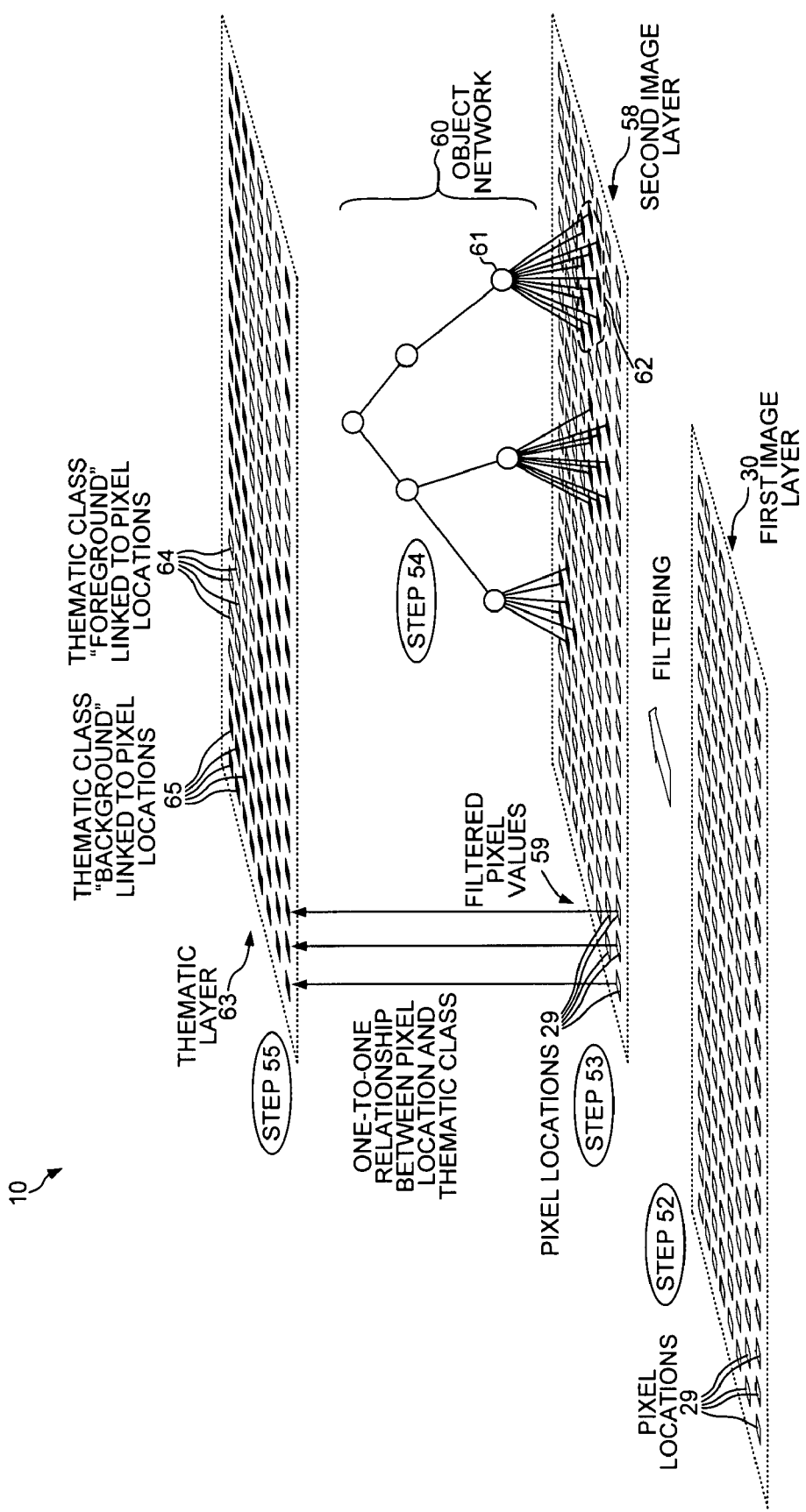
FIG. 7 is a simplified schematic diagram of the image, thematic and object layers of a network structure used to perform the method of FIG. 6 by filtering only those pixel values of an image layer that have a specific thematic class.

In the example of FIG. 7, each of the pixel locations 29 is classified as belonging either to the thematic class "foreground" or to the thematic class "background" based on the filtered pixel values 59. FIG. 7 shows some of the "foreground" classes 64 and some of the "background" classes 65 of thematic layer 63 that are linked to pixel locations 29. In one embodiment, pixel locations associated with those filtered pixel values 59 having a brightness above a specified threshold are classified as having the thematic class "foreground". Pixel locations associated with those filtered pixel values 59 having a brightness below the specified threshold have the thematic class "background".

In step 56, the first algorithm is used to process those filtered pixel values 59 of second image layer 58 that are linked to object 61. For example, an edge filter is applied to the filtered pixel values 59 that fall within pixel region 62. The result of step 56 is a third image layer with twice-filtered pixel values that are linked to object 61 of object network 60.

In step 57, the second algorithm is used to process those filtered pixel values 59 of second image layer 58 that belong to a specific thematic class. For example, a second Gaussian filter with different parameters is applied to the filtered pixel values 59 associated with pixel locations that have the thematic class "foreground". The result of step 57 is a fourth image layer with twice-filtered pixel values at the pixel locations associated with the thematic class "foreground".

In one example, the edge filter first calculates the overall mean brightness of the pixel values in a rectangular H×W neighborhood of pixel locations surrounding each pixel location linked to object 61, where H is the height in pixels and W is the width in pixels of the rectangular neighborhood. In this example, the rectangular neighborhood is a 3×3 matrix of pixel locations centered on the pixel location of interest. In another example, the neighborhood of pixel locations consists of $N^2-1$ pixel locations centered on the pixel location of interest, wherein N is an odd integer greater than one. Thus, although the edge filter is applied only to those filtered pixel values 59 associated with pixel locations linked to object 61, the edge filter uses pixel values that are not associated with pixel locations linked to object 61 to determine the filter output. The edge filter then calculates a mean darkness of those pixel values associated with the H×W neighborhood of pixel locations that are darker than the overall mean brightness. The edge filter then outputs an edge signal for each pixel location of interest. The edge signal is the absolute value of the mean darkness minus the overall mean brightness. The output of the edge filter then generates the third image layer, which is sometimes called an "edge filtered image".

In one embodiment, the edge filtered image determined in step 56 (the third image layer) is then superimposed in an additional step over the twice-filtered pixel values of the fourth image layer obtained from step 57. The superimposed image emphasizes the nuclear wall of a cell in the digital image being analyzed.

Figure 8:
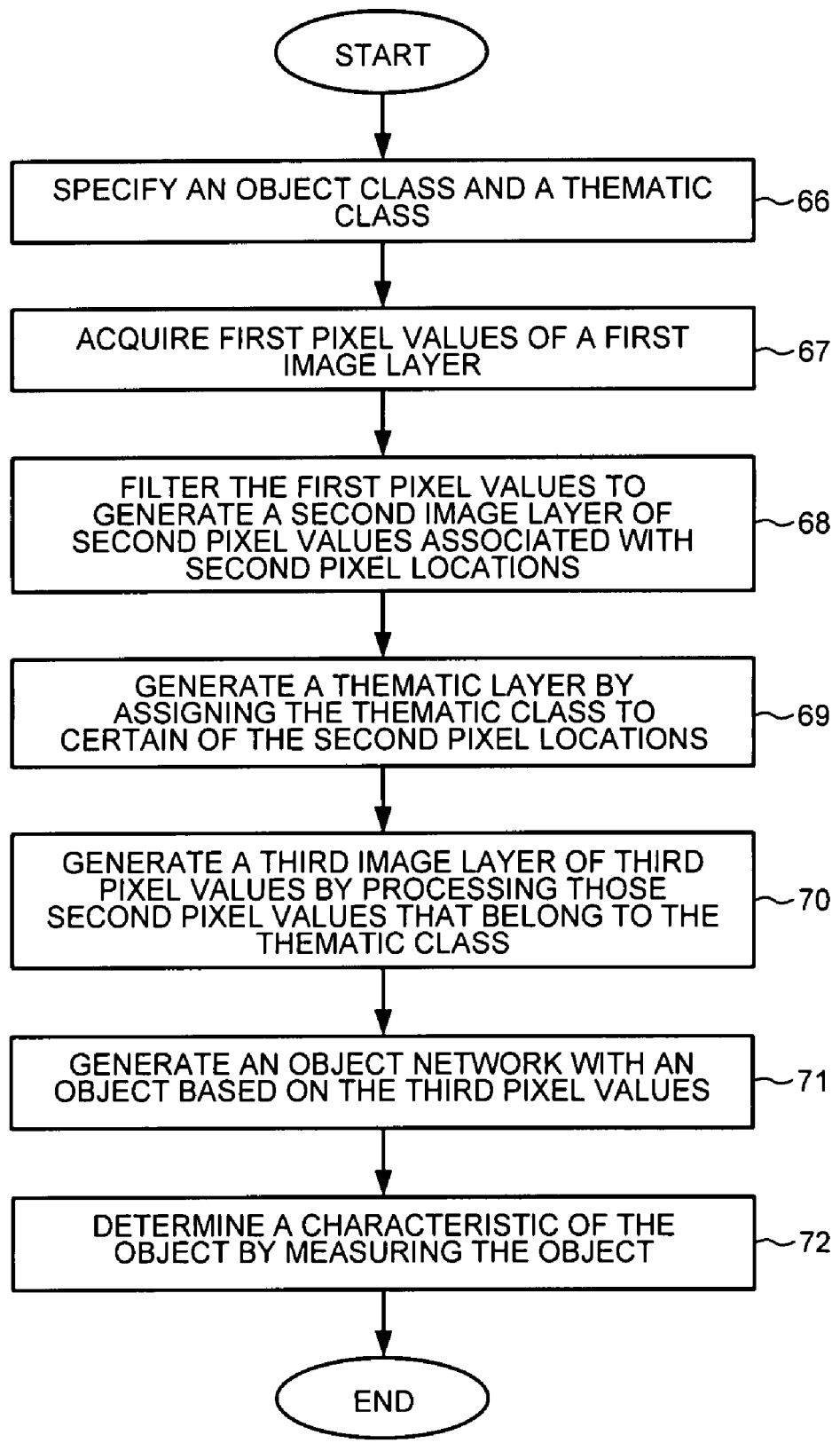
FIG. 8 is a flowchart of steps for detecting target regions by using a data network with an object generated using only those pixel values that belong to a particular thematic class.

FIG. 8 is a flowchart illustrating steps 66-72 of a method by which the analysis system measures an object in a digital image after that object is generated using only those pixel values associated with pixel locations that belong to a particular thematic class. The method of FIG. 8 analyzes the digital image by filtering a first image layer and then generating a thematic layer from the filtered image layer. Then a third image layer is generated by processing only those pixel values of the filtered image layer that are associated with pixel locations belonging to a particular class of the thematic layer. Then an object of an object network is linked to pixel locations associated with specific pixel values of the third image layer, and a characteristic of the object is determined. The steps of FIG. 8 will now be described in relation to the operation of network structure 10 of FIG. 9.

In first step 66, the user specifies a class of class network 12. The user also specifies a thematic class.

In step 67, the analysis system acquires first pixel values of first image layer 30.

In step 68, the analysis system generates a second image layer 73 of second pixel values 74 by filtering the first pixel values of first image layer 30.

In step 69, the analysis system generates a thematic layer 75 by assigning a thematic class to pixel locations associated with certain of the second pixel values 74 according to a classifier algorithm. In one aspect, pixel locations associated with those second pixel values 74 that have a brightness above a specified threshold are assigned the thematic class "foreground". The remaining pixel locations are assigned the thematic class "background". In a second aspect, the thematic class "foreground" is assigned to pixel locations associated with those second pixel values 74 that are brighter than any three of the nine pixel values in a 3×3 neighborhood of pixel values around the pixel of interest. In the second aspect, there remains a one-to-one relationship between certain of the pixel locations and the thematic class "foreground" once the thematic class of each of the pixel locations is determined using the neighborhood of pixel values in second image layer 73.

In step 70, the analysis system generates a third image layer 76 of third pixel values 77 by processing only those second pixel values 74 that are associated with pixel locations with the thematic class "foreground". For example, those second pixel values 74 that are associated with pixel locations classified in the thematic class "foreground" are filtered to generate the third pixel values 77.

Figure 9:
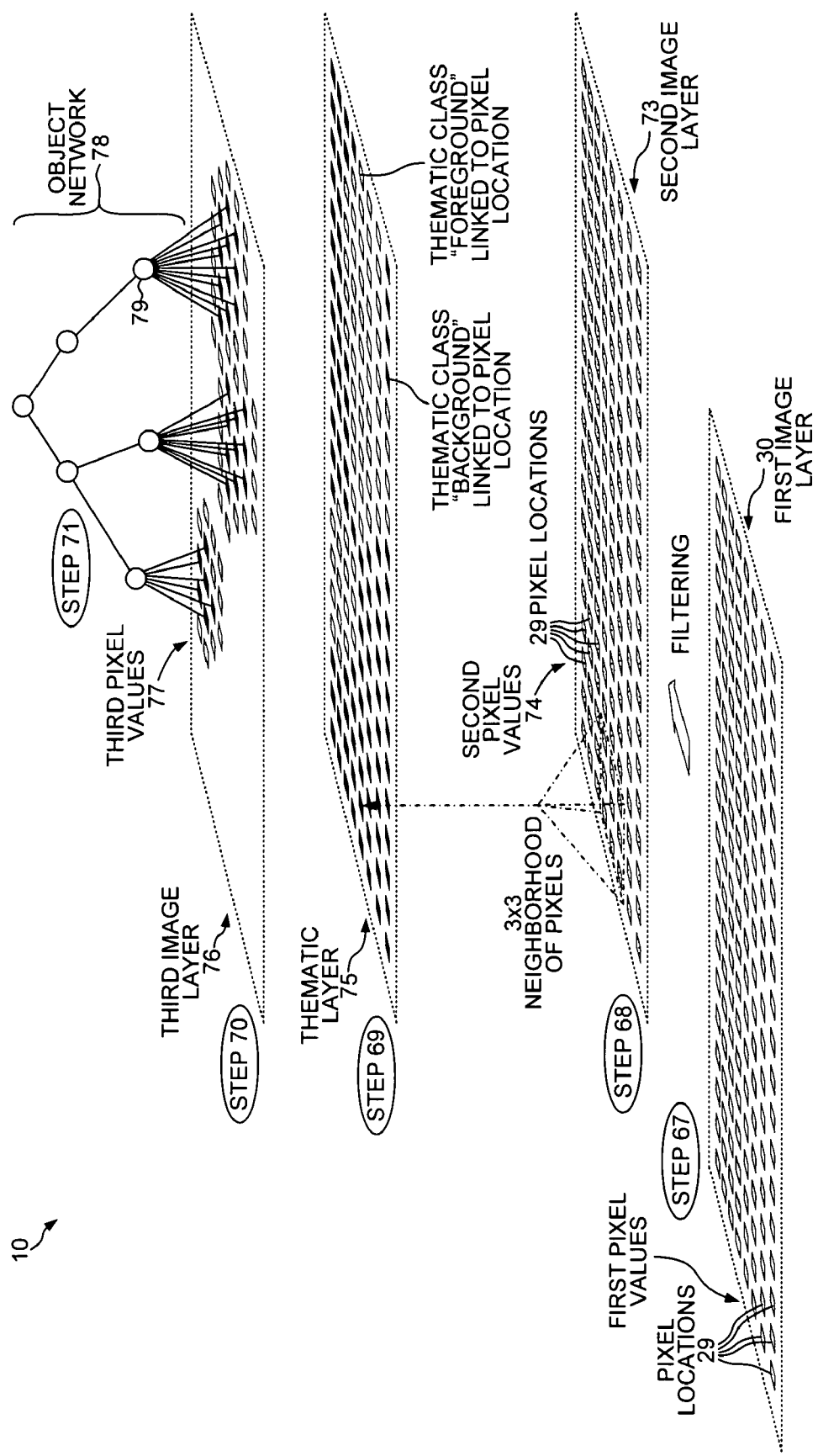
FIG. 9 is a simplified schematic diagram of a network structure used to perform the method of FIG. 8 by generating an object using only those pixel values that belong to a particular thematic class.

In step 71, the analysis system generates an object network 78 by selectively linking pixel locations associated with third pixel values 77 of third image layer 76 to objects according to process hierarchy 11 and class network 12. For example, FIG. 9 shows that an object 79 is linked to eleven of the pixel locations associated with the third pixel values 77 of third pixel layer 76. The process of generating object network 78 requires less computations than, for example, generating object network 60 of FIG. 7 because fewer pixel values are being processed to generate the object network. In this case, only pixels values associated with foreground pixel locations are processed.

In step 72, the analysis system determines a characteristic of object 79 by measuring the object. For example, the area of object 79 is measured by counting the number of pixel locations linked to object 79. In another example, the circumference of object 79 is determined by counting the number of pixel locations linked to object 79 that are contiguous to at least one pixel location that is associated with the third pixel values 77 and that is not linked to object 79.

Figure 10:
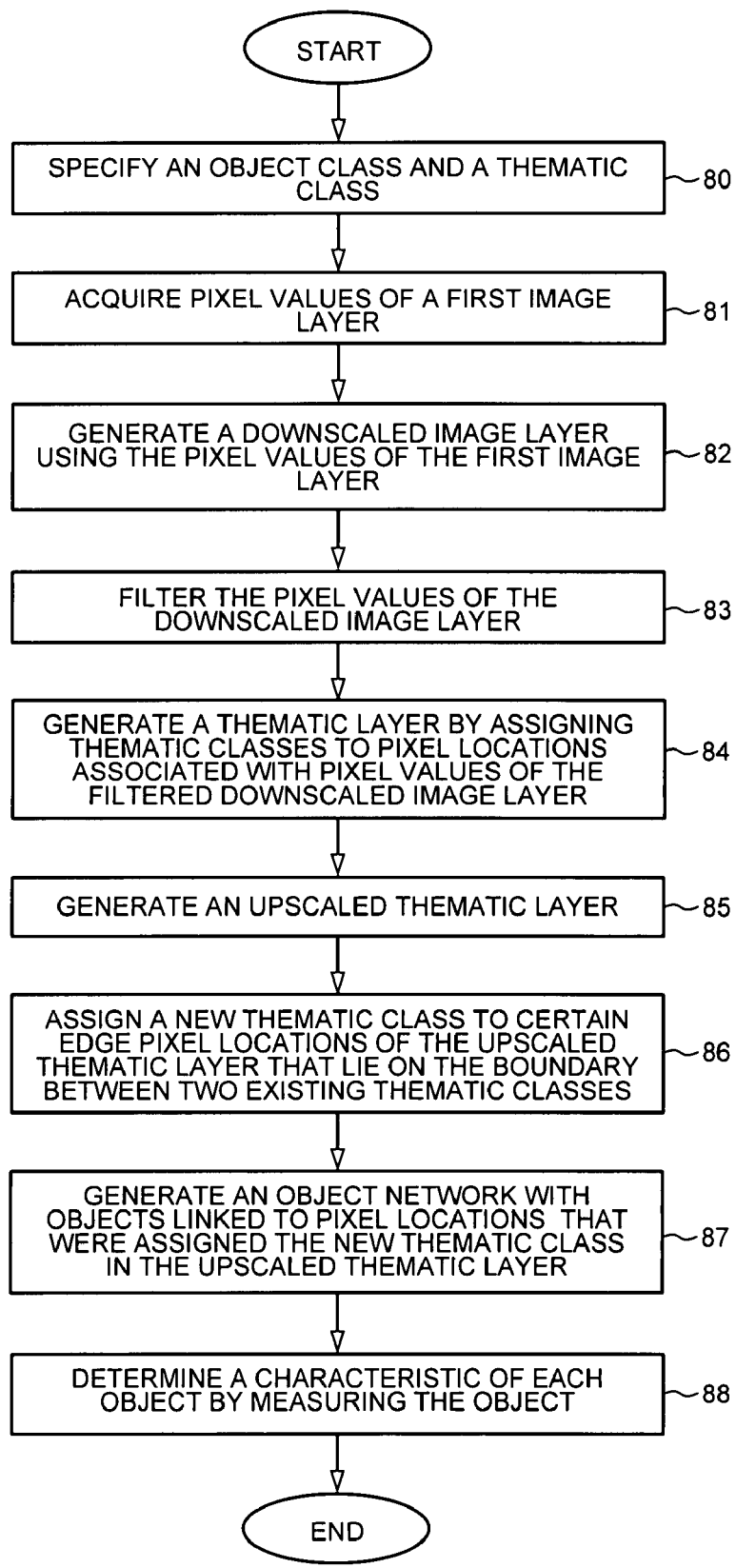
FIG. 10 is a flowchart of steps for detecting patterns by generating an object for each pattern and by linking that object to pixel values identified using thematic classes.

FIG. 10 is a flowchart illustrating steps 80-88 of a method by which the analysis system detects patterns in a digital image by generating an object for each pattern and by linking that object to pixel locations identified using thematic classes. FIGS. 11 through 19 are screenshots of the graphical user interface of the analysis system in an application that detects nuclear membranes in a microscopic digital image of cells. The steps of FIG. 10 will now be described as those steps are depicted on the graphical user interface of the analysis system as shown in FIGS. 11 through 19.

Figure 11:
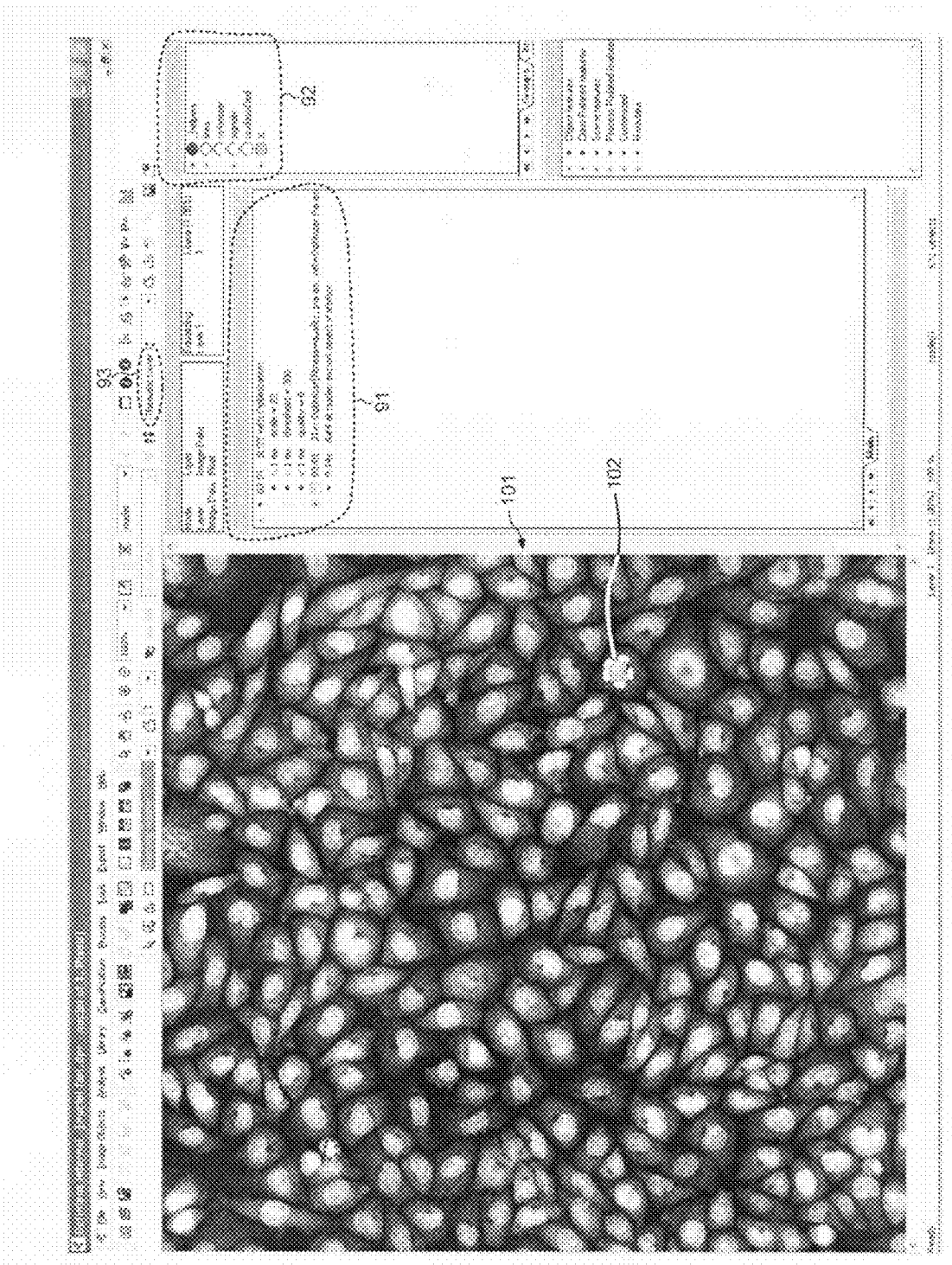
FIG. 11 is a screenshot of a graphical user interface generated by the analysis system to enable the user to specify process steps, object classes and thematic classes. The graphical user interface also shows the pixel values that comprise an image layer.

FIG. 11 shows the graphical user interface during steps 80 and 81. In step 80, the user specifies object classes and thematic classes. In this application, the user specifies an object class "membrane" for the membrane of a nucleus of a cell. The user specifies the thematic classes "nucleus", "boundary" and "background".

The graphical user interface is used to specify the process steps of process hierarchy 11 and the classes of class network 12. The user edits the process steps that are listed in a box 91 labeled "Process Tree". Hidden process steps of process hierarchy 11 can be revealed by clicking on a "+" in the process tree in box 91. The method carried out by the steps of process hierarchy 11 illustrates how complex patterns can be recognized in a digital image faster and more accurately by combining pixel-oriented and object-oriented processing than by using either of these processing techniques alone. The time required to perform each process step is given in seconds and milliseconds at the beginning of each process step in box 91. Box 91 shows that the entire process of detecting the nuclear membranes takes 3.01 seconds.

The user specifies class network 12 using a box 92 labeled "Class Hierarchy". The classes shown in box 92 describe categories of objects that the user expects to find in the digital image of cells. Class network 12 also includes the classes "helpers" and "unclassified". The analysis system assigns certain objects to "helper" classes during the iterative segmentation and classification process and before the analysis system determines the optimal class for those objects.

The user also uses the graphical user interface to specify thematic classes that describe categories of pixels, including the thematic classes "nucleus", "boundary" and "background". The boundary pixels are between nucleus pixels and background pixels. The user chooses a specific thematic layer from a pulldown menu 93 in order to specify the characteristics of that thematic layer. In FIG. 11, "Thematic Layer 1" has been selected. A pop-up window is then used to edit the parameters of the selected thematic layer.

Figure 12:
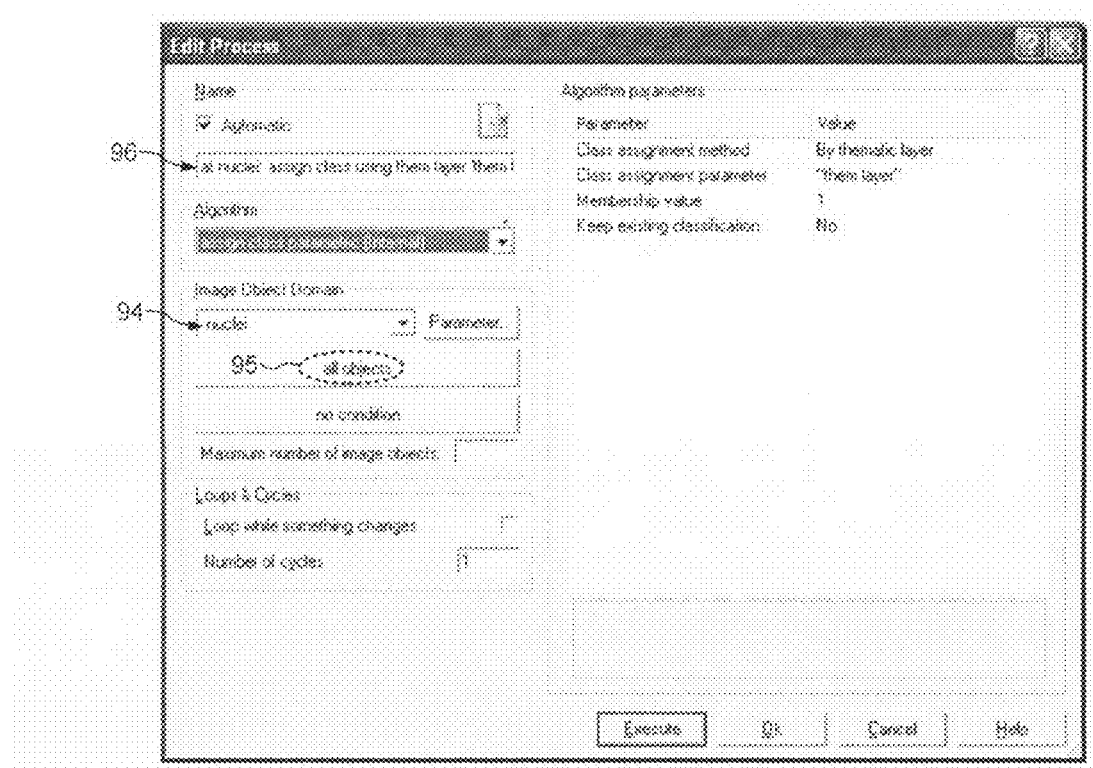
FIG. 12 is a screenshot of a pop-up window used to assign thematic classes to pixel values based on the object to which the pixel values are linked.
Figure 13:
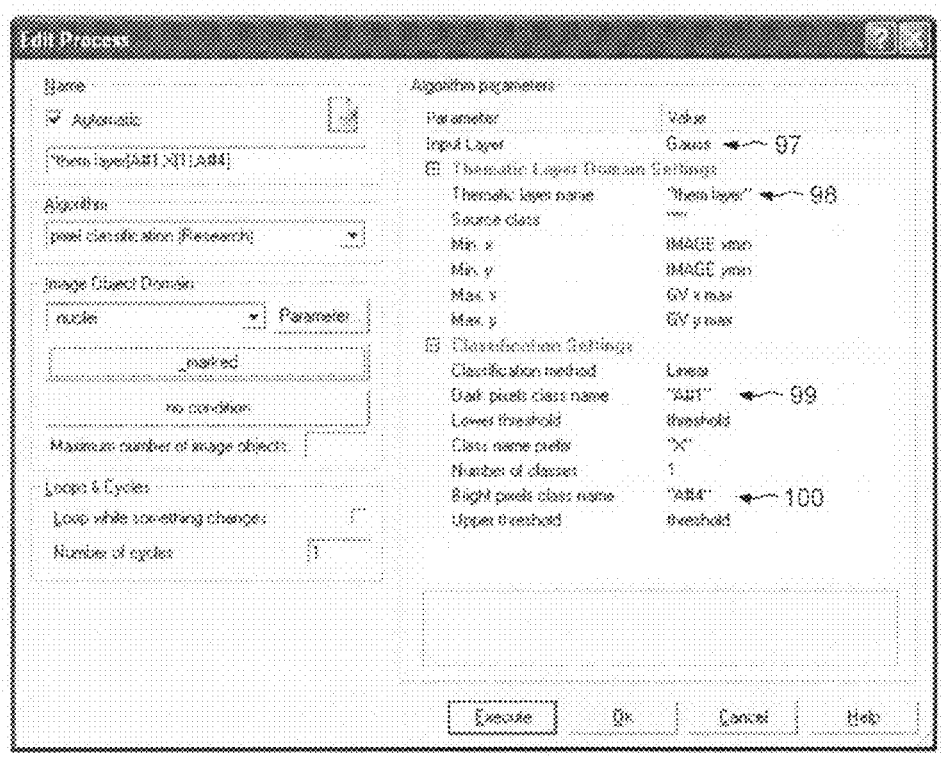
FIG. 13 is a screenshot of the pop-up window of FIG. 12 showing additional detail relating to the parameters that the user has assigned to thematic classes.

FIGS. 12 and 13 show pop-up windows of the graphical user interface used to specify thematic classes. In FIG. 12, the user assigns thematic classes to pixel locations based on the object to which the pixel locations are linked. The user has chosen 94 to classify pixel locations that are linked to objects belonging to the object class "nuclei". The user has also chosen 95 to classify pixel locations that are linked to all of the objects in the "nuclei" class, as opposed to only marked objects in the "nuclei" class. The user's specification of the thematic class is reflected in the name 96 given to the process step that generates a thematic layer with the thematic classes.

FIG. 13 shows additional detail of the pop-up window relating to the parameters that the user has assigned to the thematic classes. FIG. 13 shows that the pixel values of the input image layer named "Gauss" 97 are being classified. The output thematic layer is named "them layer" 98. The thematic class assigned to pixel locations associated with darker background pixel values is named "A#1" 99. The thematic class assigned to pixel locations associated with brighter pixel values in nuclei in the foreground is named "A#4" 100. For the sake of clarity, the thematic class "A#1" will be referred to herein as the "background" class, and the thematic class "A#4" will be referred to herein as the "nucleus" class.

After the object classes and thematic classes have been specified in step 80, the analysis system acquires pixel values in step 81. FIG. 11 shows that the analysis system has acquired pixel values of a microscopic digital image of cells. For example, the digital image is comprised of 8-bit values ranging from 0-255. The pixel values comprise a first image layer 101 that is displayed in the large box towards the left of the graphical user interface. The user has previously specified process steps, object classes and thematic classes of an application that detects nuclear membranes. An example 102 of one such nuclear membrane that the application is to detect is highlighted in first image layer 101.

Figure 14:
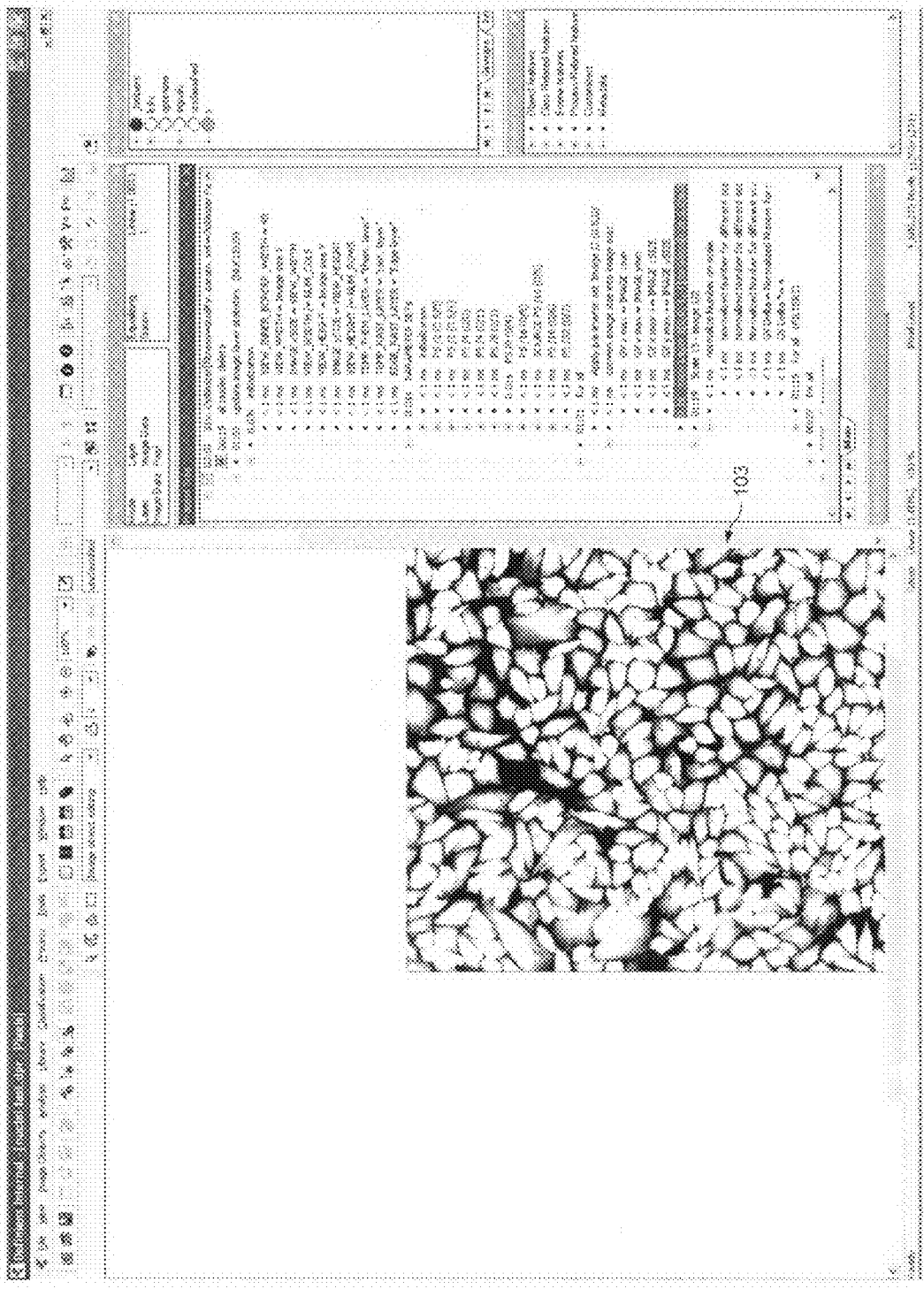
FIG. 14 is a screenshot of the user interface showing the image layer of FIG. 11 that has been downscaled in order to facilitate faster filtering.

In step 82, the analysis system generates a downscaled image layer 103 using the pixel values of first image layer 101. FIG. 14 shows downscaled image layer 103 in the lower right corner of the large box in the graphical user interface. Pixel-oriented processing is used to reduce the size of the image layer. First image layer 101 is first filtered with a Gaussian filter that removes detail from the image by blurring the distinction between bright and dark pixel values. Then downscaled image layer 103 is generated using one new pixel value for each 2×2 square of pixel values of first image layer 101. For example, the upper right pixel (e.g., 2x, 2y) of each 2×2 square in first image layer 101 is transferred to downscaled image layer 103. Thus, the pixel value of each pixel location 2x, 2y of first image layer 101 becomes the pixel value of pixel location x, y of downscaled image layer 103. The downscaled image layer 103 has one quarter as many pixel values as does first image layer 101.

In step 83, the new pixel values of downscaled image layer 103 are filtered. The speed of filtering downscaled image layer 103 is increased because computations need be performed on fewer pixel values than are present in first image layer 101. FIG. 14 shows downscaled image layer 103 after a first filtering step.

Figure 15:
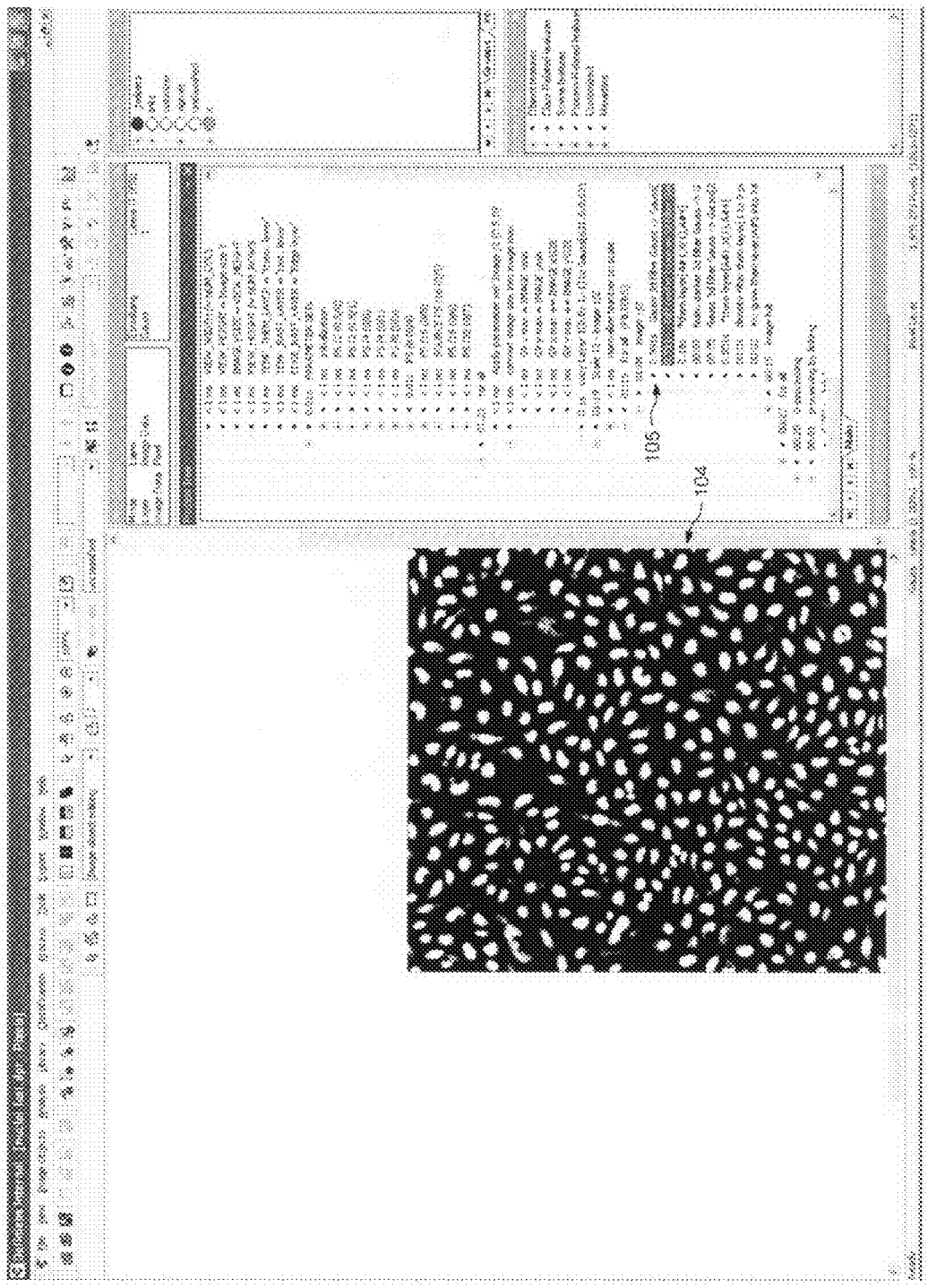
FIG. 15 is a screenshot of the user interface showing a twice-filtered image layer after downscaling.

FIG. 15 shows a twice-filtered image layer 104 after downscaled image layer 103 has undergone a second filtering step. The second filter applied to downscaled image layer 103 is also a Gaussian filter. The process hierarchy shown in FIG. 15 indicates 105 that performing the second Gaussian filtering takes 0.991 seconds.

Figure 16:
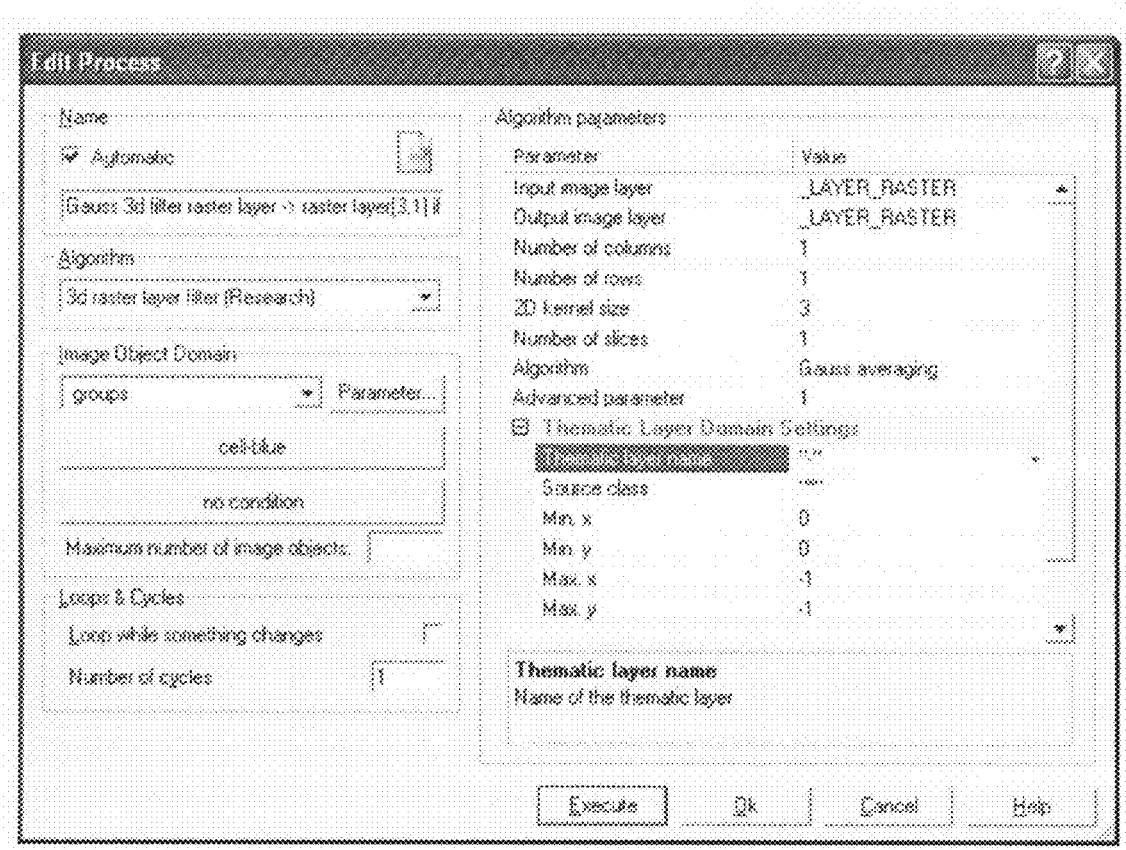
FIG. 16 is a screenshot of a pop-up window used to specify the parameters of a Gaussian filter that is applied to pixel values linked to specified objects.

FIG. 16 shows a pop-up window of the graphical user interface used to specify the parameters of a Gaussian filter in an application other than the method of FIG. 10. The button entitled "cell-blue" in the "Image Object Domain" box indicates that the filter will be applied to pixel values associated with pixel locations that are linked to objects classified as "cell-blue" in this example. Under "Thematic Layer Domain Settings", the user can specify that the Gaussian filter is to be applied to pixel values associated with pixel locations assigned to a specified thematic class.

Figure 17:
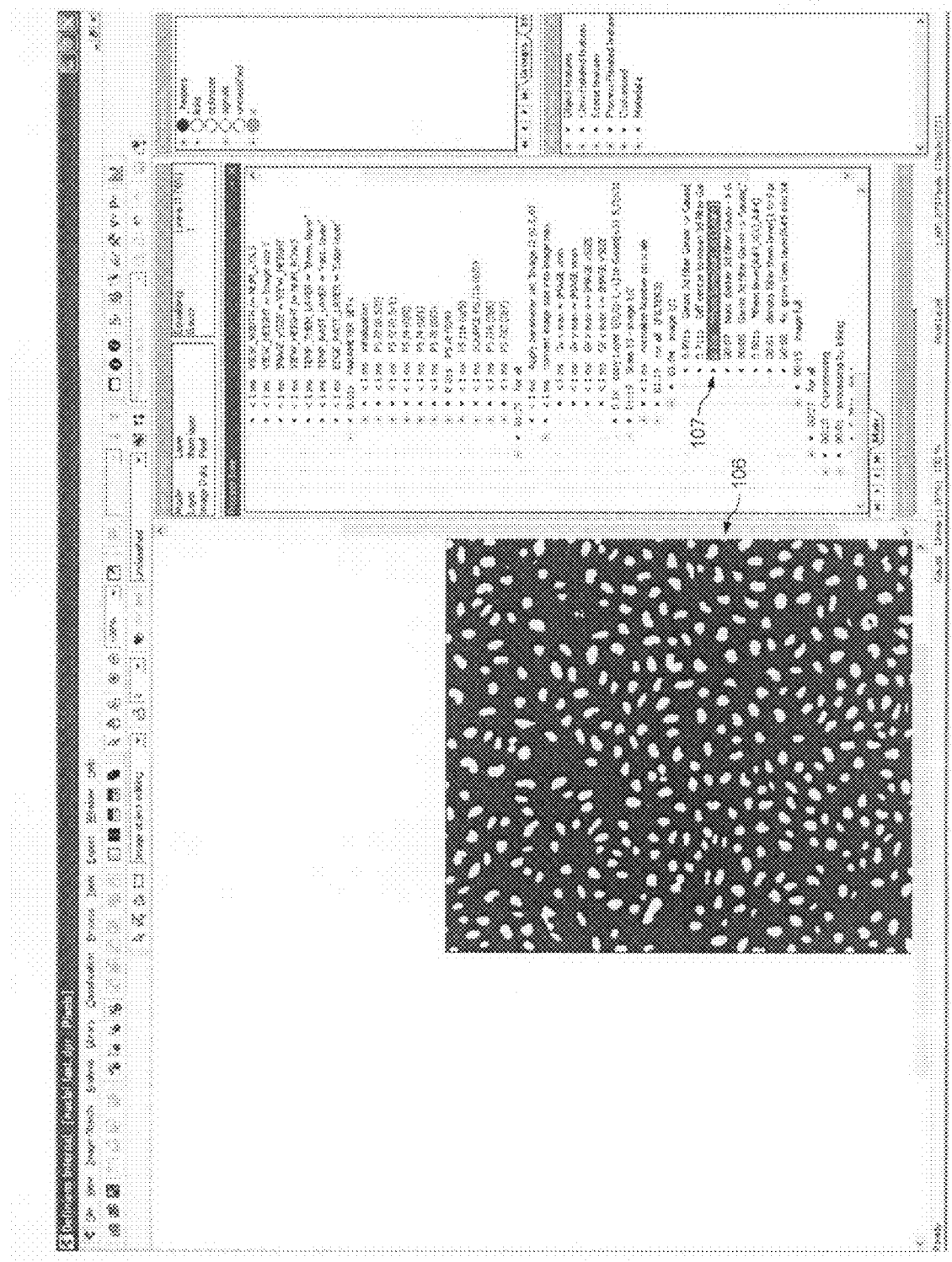
FIG. 17 is a screenshot of the user interface showing a thematic layer in which a thematic class has been assigned to all pixel values having a brightness above a specified threshold. The user interface also shows steps of the process hierarchy that generate the thematic layer.

In step 84, the analysis system generates a thematic layer 106 by assigning various thematic classes to pixel locations associated with the pixel values of twice-filtered image layer 104. FIG. 17 shows thematic layer 106 in which the thematic class "nucleus" has been assigned to all pixel locations whose pixel values have a brightness above a specified threshold, and all other pixel locations have been assigned the thematic class "background". The process hierarchy shown in FIG. 17 indicates 107 that generating the thematic layer "them layer" takes 0.18 seconds. In the process hierarchy listing, the "nucleus" class is designated by "A#4", and the "background" class is designated by "A#1".

Figure 18:
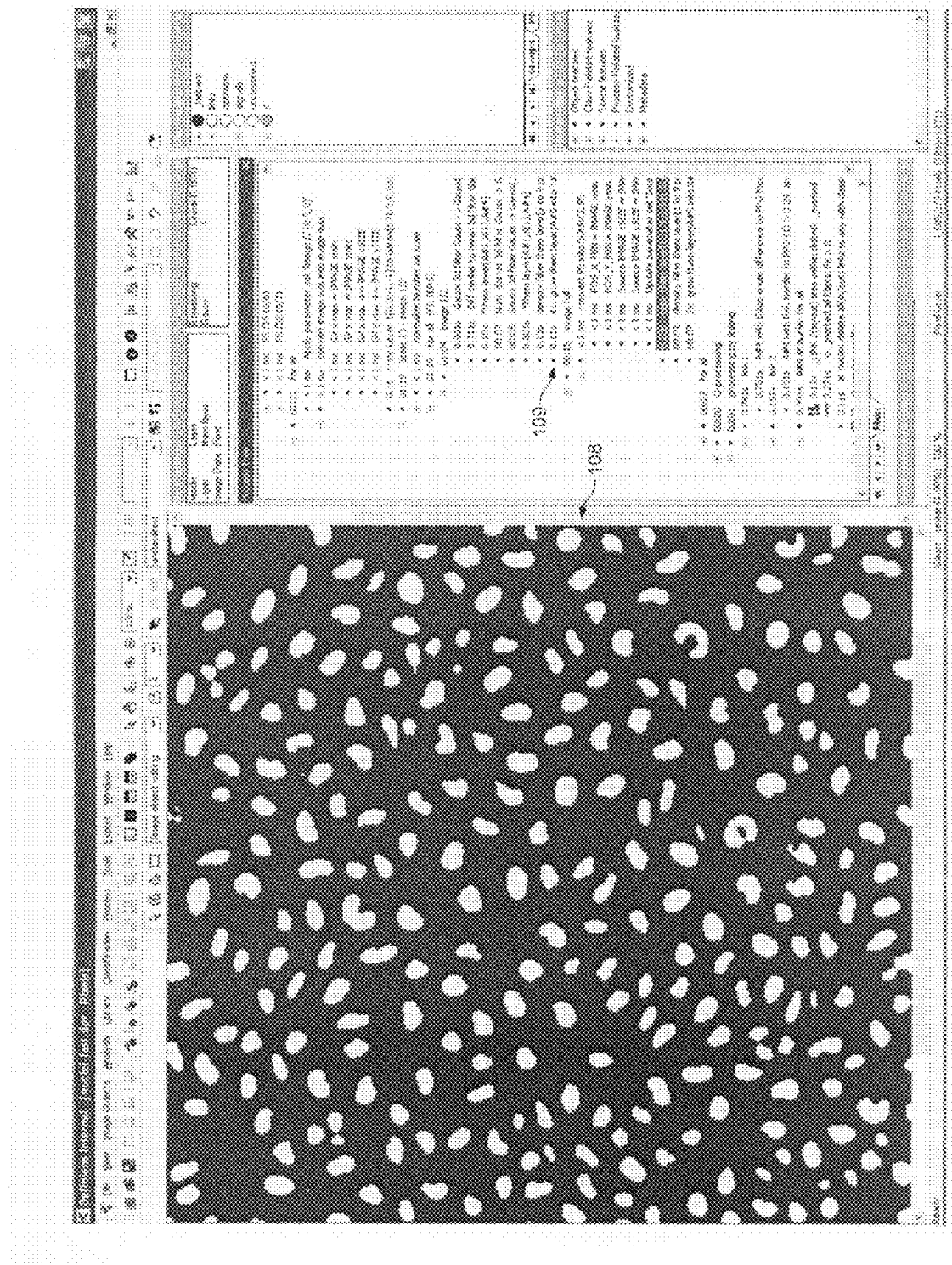
FIG. 18 is a screenshot of the user interface showing the thematic layer of FIG. 17 after upscaling.

In step 85, thematic layer 106 is expanded to generate an upscaled thematic layer 108. For example, each pixel of thematic layer 106 that represents a thematic class is converted into a 2×2 square of pixels all having the thematic class of the original pixel. Thus, upscaled thematic layer 108 has four times as many pixels as does thematic layer 106. FIG. 18 shows upscaled thematic layer 108. The process hierarchy shown in FIG. 18 indicates 109 that generating upscaled thematic layer 108 by expanding thematic layer 106 takes 0.11 seconds.

Figure 19:
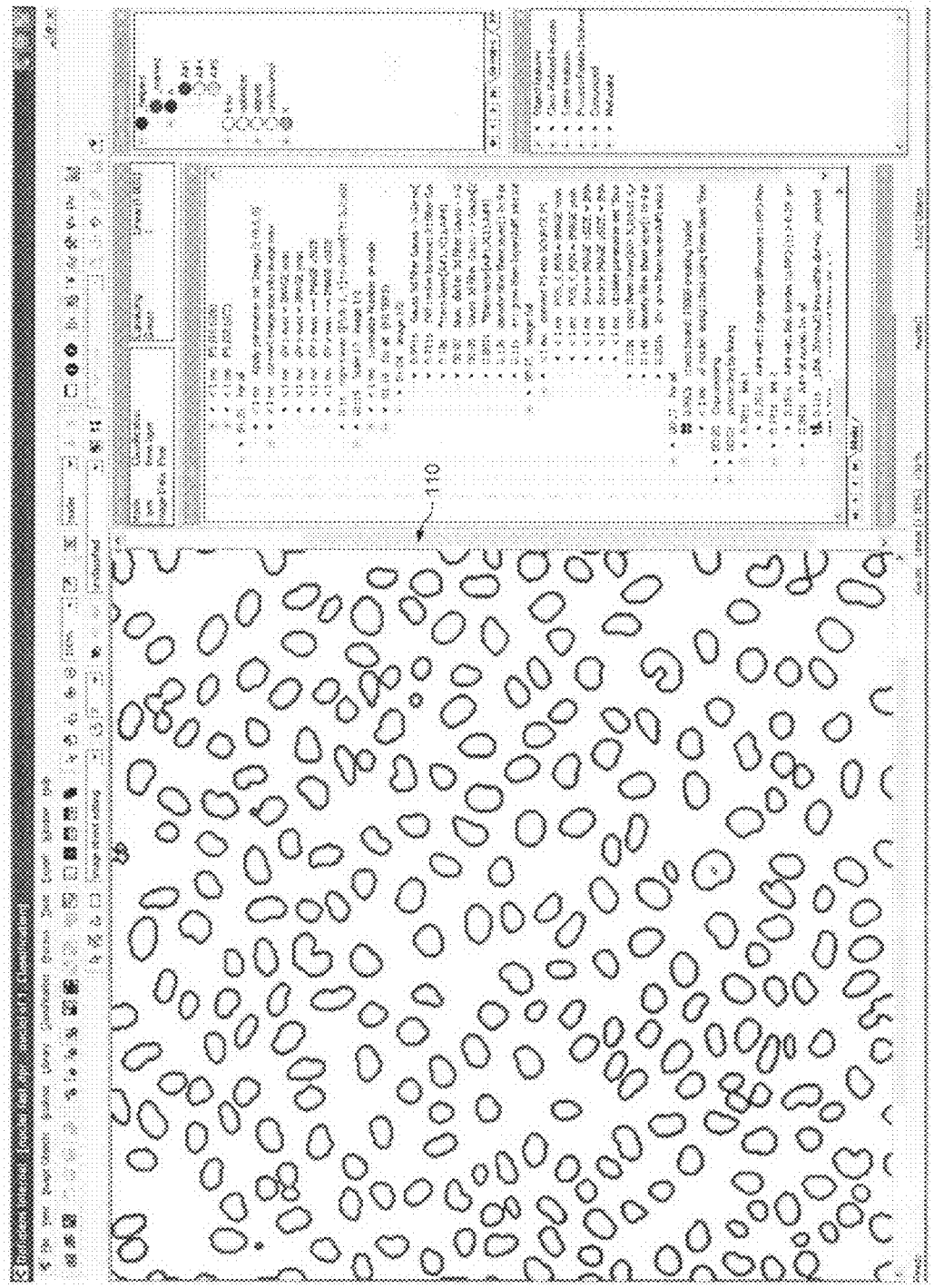
FIG. 19 is a screenshot of the user interface showing an enhanced upscaled thematic layer after a new thematic class has been assigned to edge pixels on the boundary between two other thematic classes.

In step 86, the analysis system assigns the thematic class "boundary" to certain pixels of upscaled thematic layer 108 according to the specification of the thematic class "boundary". FIG. 19 shows enhanced upscaled thematic layer 110 after the thematic class "boundary" has been assigned to edge pixel locations on the boundary between "nucleus" and "background" thematic classes. In one embodiment, the analysis system assigns the thematic class "boundary" by analyzing a 3×3 neighborhood of pixels surrounding each pixel location of interest. The analysis system assigns the thematic class "boundary" to each pixel location of interest for which at least three of the remaining eight pixel locations in the 3×3 neighborhood have the thematic class "nucleus" and at least three of the remaining eight pixels have the thematic class "background".

Figure 20:
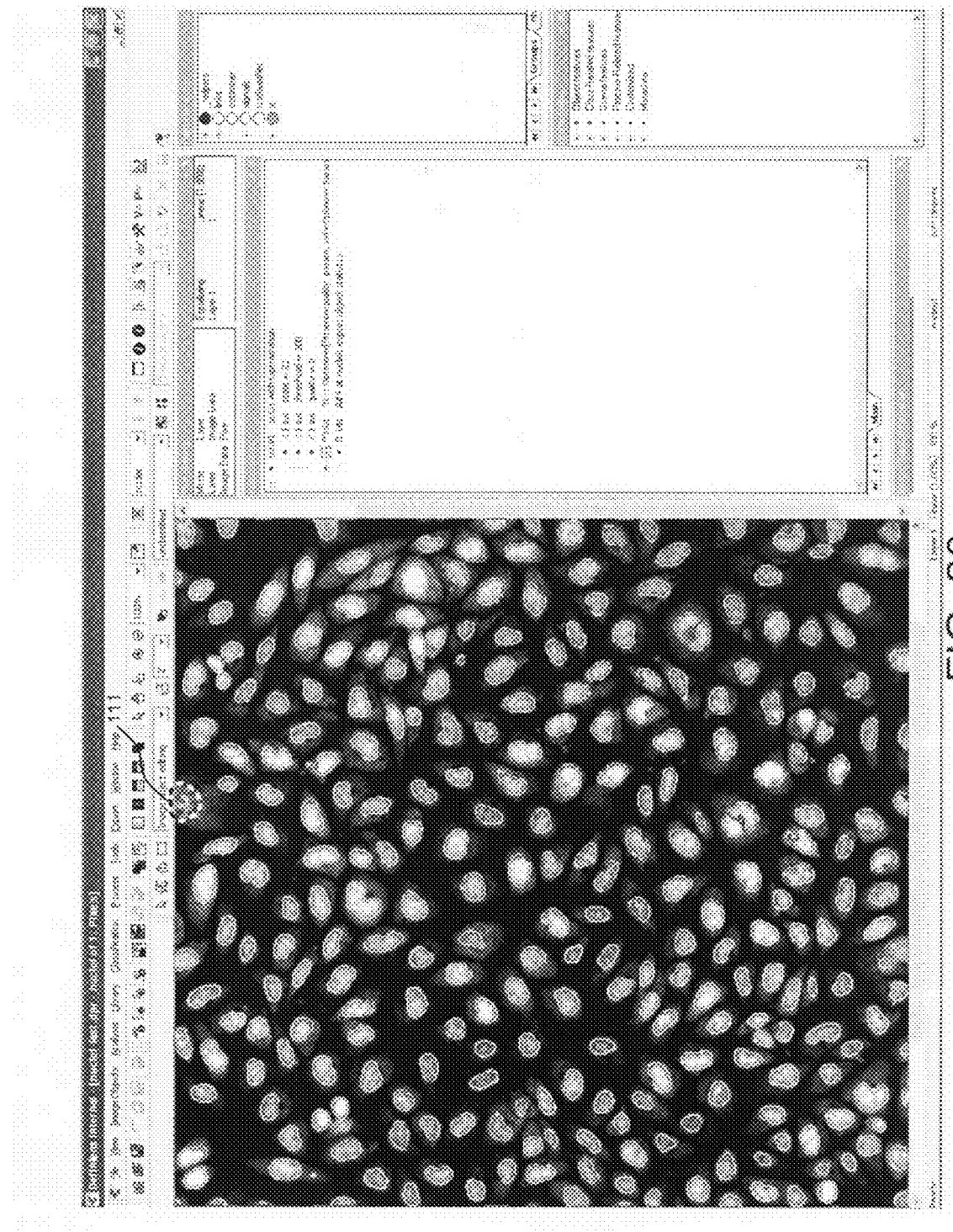
FIG. 20 is a screenshot of the user interface showing the image layer of FIG. 11 in which pixel values linked to objects corresponding to the new thematic class of FIG. 19 are highlighted.

In step 87, an object network is generated by linking objects to pixel locations associated with certain pixel values of first image layer 101. The objects in the object class "membrane" specified in step 80 are linked to the same pixel locations that were assigned the thematic class "boundary" in upscaled thematic layer 108. In FIG. 20, the pixel locations that are linked to objects in the object class "membrane" are highlighted.

In step 88, the analysis system determines characteristics of each of the nuclear membranes detected in first image layer 101. The analysis system detects and analyzes the nuclear membranes in the microscopic digital image of cells by employing both pixel-oriented processing to determine the location of pixels assigned to the thematic class "boundary", as well as object-oriented processing to measure the nuclear membranes. The nuclear membranes can be more easily analyzed because all of the pixel locations associated with pixel values that comprise each nuclear membrane are linked to an object. For example, the length of each nuclear membrane can easily be measured by counting the number of pixel locations linked to each object. The longest dimension of each nuclear membrane can be measured by calculating the greatest distance between any two pixel locations linked to each object.

Objects can be generated in step 87 in addition to objects in the object class "membrane". For example, objects in the object class "nucleus" can be linked to the same pixel locations as were assigned the thematic class "boundary" or the thematic class "nucleus" in upscaled thematic layer 108. Then in step 88, the area of each nucleus can easily be measured by counting the number of pixel locations linked to each object having an object class "nucleus". Objects in the object class "nucleus" can be reclassified as noise, spectroscopic artifacts or multiple superimposed nuclei if the calculated area exceeds a specified maximum area or does not reach a specified minimum area. An example of objects 111 that will be reclassified as spectroscopic artifacts are outlined in FIG. 20. By using objects in addition to pixel classification, a more accurate detection of nuclear membranes is achieved.

FIGS. 21 through 28 are screenshots of the graphical user interface of the analysis system in an application that detects nuclei in a microscopic digital image of cells. FIGS. 21 through 28 illustrate a method by which the analysis system detects the nuclei by (i) identifying target regions in the digital image using thematic classes, (ii) linking pixel locations in the target regions to generate objects, and (iii) applying filters with different parameters to the pixel values associated with pixel locations linked to different objects.

Figure 21:
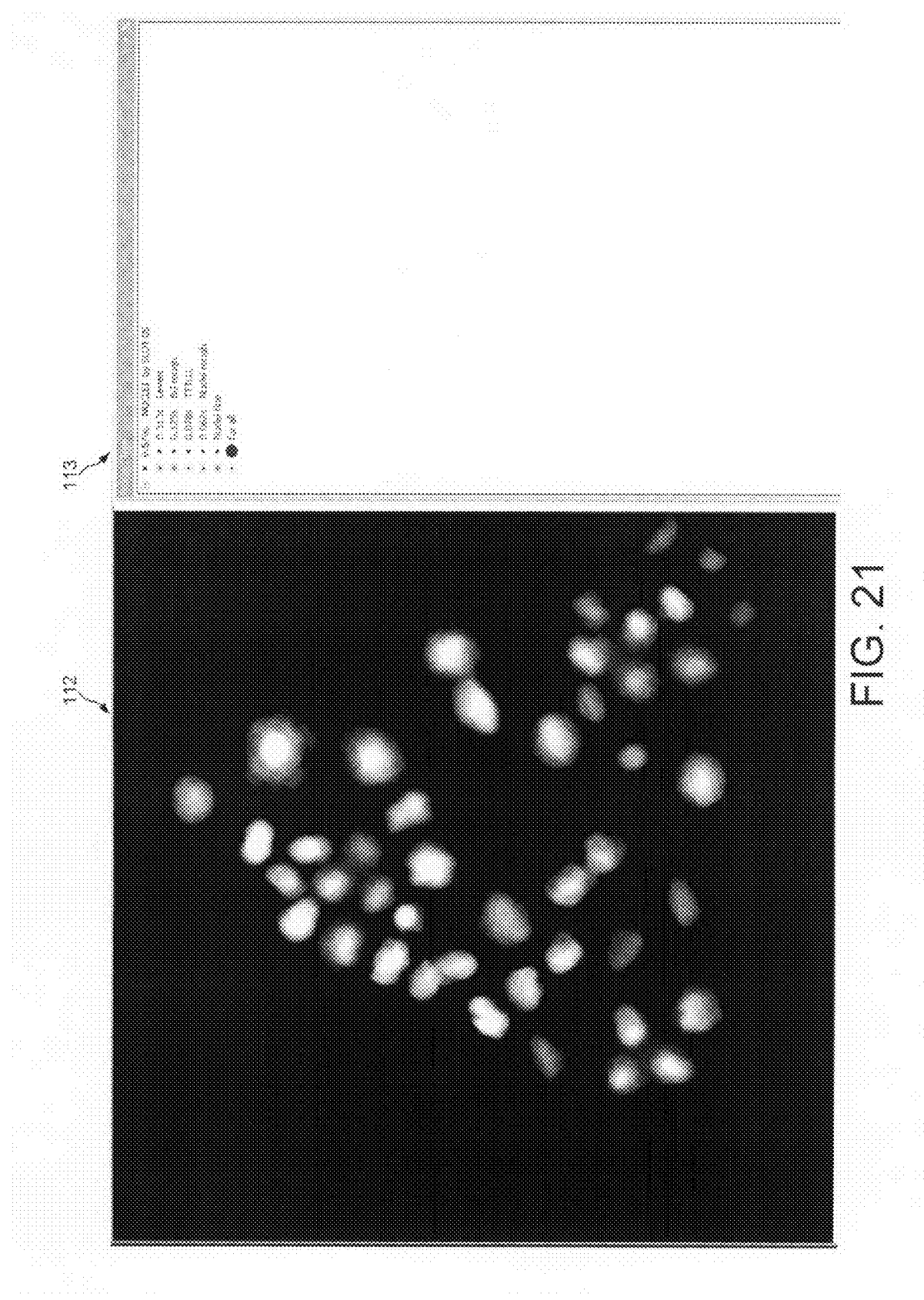
FIG. 21 is a screenshot of a graphical user interface generated by the analysis system to enable the user to specify process steps of a method to detect nuclei in a digital image. The graphical user interface also shows the pixel values that comprise an image layer of the digital image.

FIG. 21 shows a first image layer 112 of pixel values acquired by the analysis system. First image layer 112 includes various nuclei that are to be detected. The average brightness of the various nuclei differs. Thus, the nuclei cannot be accurately detected using only pixel-oriented processing that recognizes pixel values with a brightness above a specified threshold. The process steps of the process hierarchy for detecting nuclei appear in unexpanded form in a box 113 on the right side of the graphical user interface.

First image layer 112 is de-magnified to generate a downscaled image layer. In one aspect, the downscaling is performed using object-oriented processing. Objects in an object network are linked to each 4×4 matrix of pixel values of first image layer 112. Then the mean brightness of the sixteen pixel values of each object is determined. Finally, a downscaled image layer is generated using one new pixel value for each 4×4 square of pixel values of first image layer 112. Each new pixel value has the mean brightness of the sixteen pixel values of the corresponding 4×4 square of first image layer 112. Thus, the downscaled image layer has one sixteenth as many pixel values as does first image layer 112. Next, a thematic layer is generated using the downscaled image layer.

Figure 22:
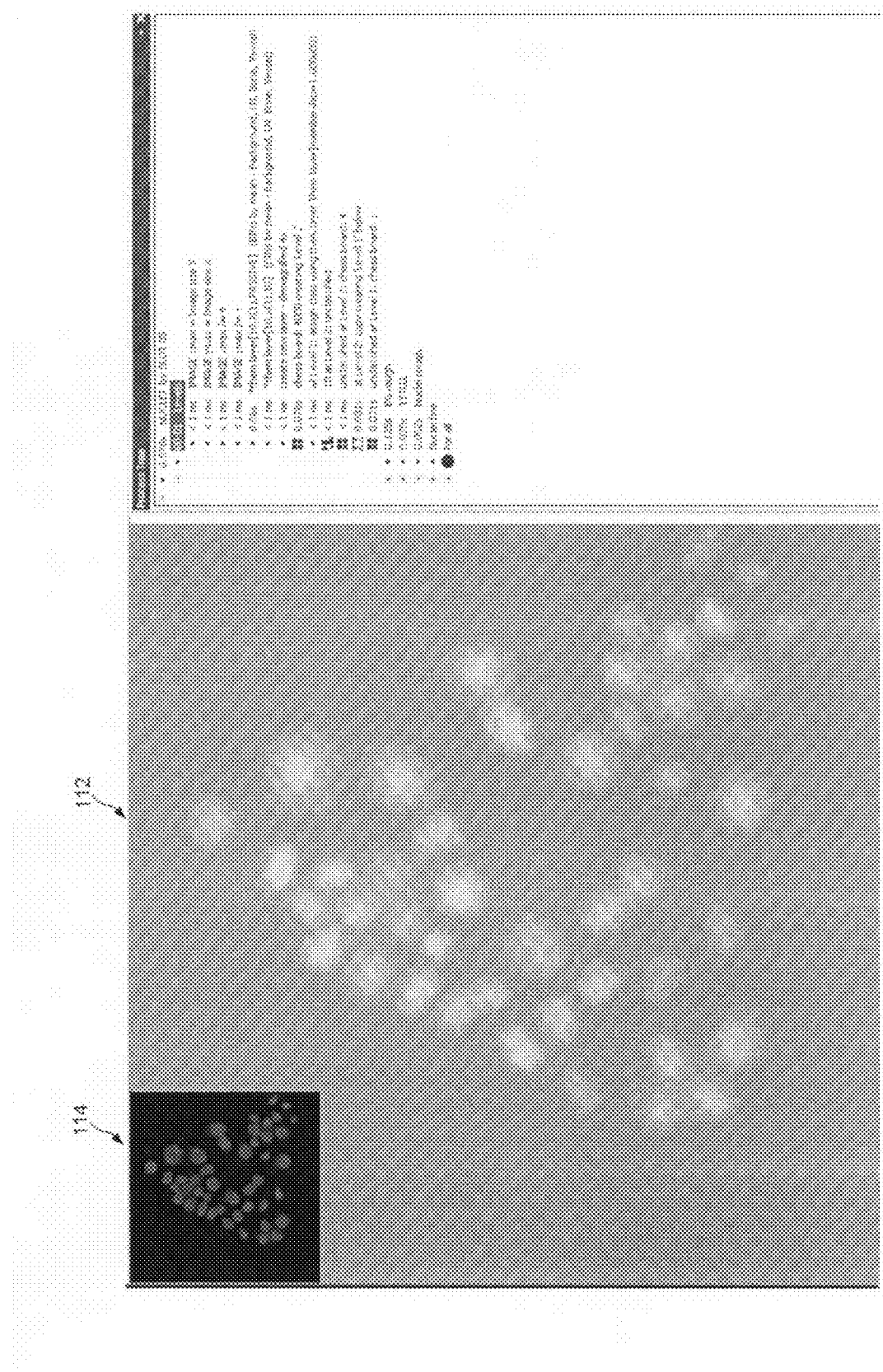
FIG. 22 is a screenshot of the user interface showing a downscaled thematic layer in the upper left corner of the image layer of FIG. 21.

FIG. 22 shows a thematic layer 114 in the upper left corner of first image layer 112. The pixel locations of all pixel values with a brightness above a specified threshold are assigned a thematic classification of "foreground". The remaining pixel locations are assigned a thematic classification of "background". Then a first object network is generated using first image layer 112 and thematic layer 114. All pixel values of first image layer 112 whose pixel locations are assigned the thematic class "background" are linked to an object "background". The remaining pixel locations are linked to an object "foreground".

Next, a new brightness threshold for determining the background is determined. A "chess-board" process is applied to the pixel values of the "background" object. The "background" object is divided into 4×4-pixel sub-objects. Then, the ten darkest 4×4-pixel objects are determined, and the brightest of those is chosen. The average brightness (grey value) of that brightest dark 4×4-pixel object is then multiplied by a factor of 1.5. After the integer ten is added to the multiplied brightness value, the result is used as the new brightness threshold of the background.

A second image layer is then generated using only pixel values whose brightness is above the new brightness threshold. Thus, the second image layer has only foreground pixel values. A new thematic class is assigned in thematic layer 114, and an edge filter is applied only to those pixel values of the second image layer that are associated with pixel locations having a foreground class. By operating only on those pixel values associated with foreground pixel locations, the speed of the overall analysis is increased.

To assign the new thematic class in thematic layer 114, the number of darker pixel values is first determined in a 9×9 neighborhood of pixels surrounding each pixel of interest. There are eighty other pixel values in each 9×9 neighborhood of pixels. Thus, each pixel of interest receives a value from zero through eighty. A new thematic class "seed" is assigned in thematic layer 114 to each pixel location for which the pixel of interest has a value greater than forty and for which the pixel location was originally assigned the thematic class "foreground". Thematic layer 114 now has three thematic classes: "background", "foreground" and "seed".

Figure 23:
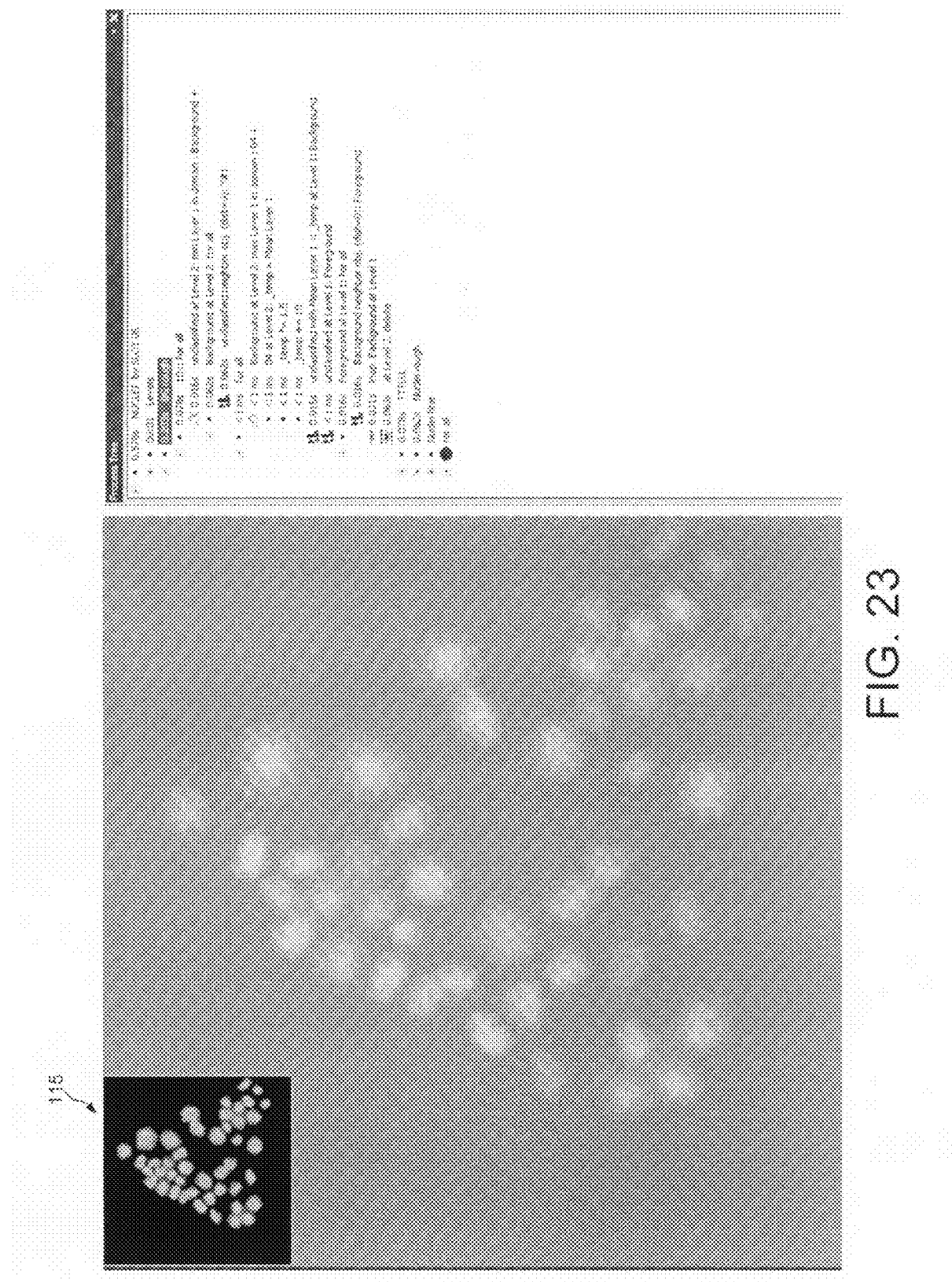
FIG. 23 is a screenshot of the user interface showing an image layer generated by applying an edge filter only to pixel values assigned to a particular thematic class.

The edge filter is next applied to the second image layer, which has only pixel values at pixel locations assigned the thematic class "foreground". The result of applying the edge filter is placed in a new image layer called "Gauss". New image layer "Gauss" 115 is shown in FIG. 23. The edge filter first calculates the overall mean brightness of the pixel values in a rectangular H×W neighborhood of pixels surrounding each pixel of interest in the second image layer, where H is the height in pixels and W is the width in pixels of the rectangular neighborhood. In this example, the rectangular neighborhood is a 3×3 matrix of pixels surrounding the pixel of interest. Thus, although the edge filter is applied only to pixels associated with "foreground" pixel locations, the edge filter uses pixels associated with background and seed pixel locations to determine the filter output. The edge filter then calculates a mean darkness of those pixel values in the H×W neighborhood of pixels that are darker than the overall mean brightness. The edge filter then outputs an edge signal for each pixel of interest. The edge signal is the absolute value of the mean darkness minus the overall mean brightness. Thus, new image layer "Gauss" 115 includes pixel values whose pixel locations have been classified as "foreground" and "seed". Moreover, some of the pixel values that have been overwritten with edge signals.

Next, a fourth thematic class "edge" is assigned in thematic layer 114. Thematic layer 114 now has the four thematic classes: "background", "foreground", "seed" and "edge". All pixel locations that were previously assigned the thematic class "foreground" are assigned the thematic class "edge" if the corresponding pixel value in new image layer "Gauss" 115 exceeds a specified threshold.

Figure 24:
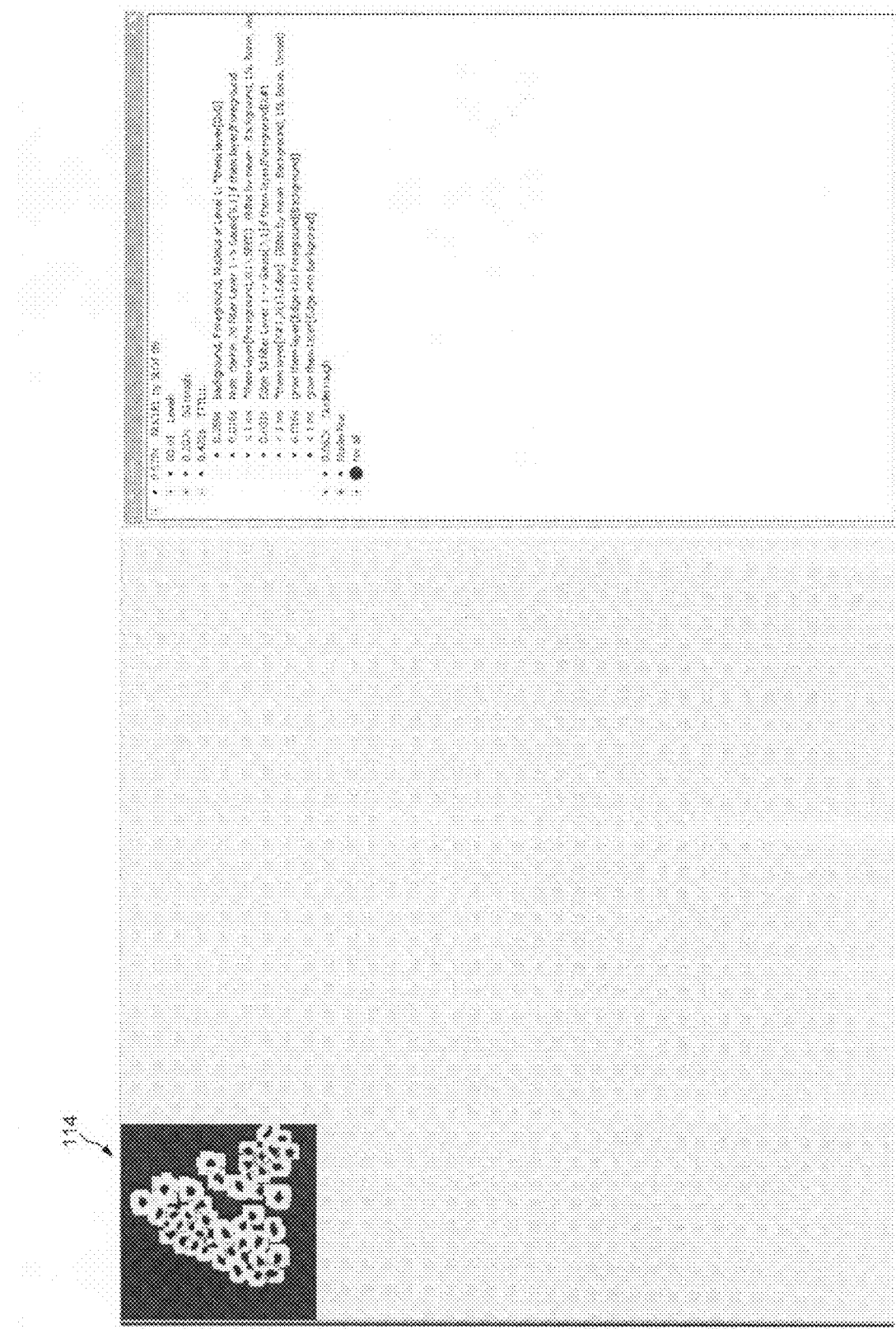
FIG. 24 is a screenshot of the user interface showing a thematic layer in which pixels assigned to one thematic class have been expanded into a neighboring thematic class.

FIG. 24 illustrates how the edge pixel locations in thematic layer 114 are expanded into the neighboring pixel locations classified as "background" and "foreground". The thematic class of each pixel location in either the "background" or "foreground" thematic class that is contiguous to a pixel location in the "edge" thematic class is converted to the "edge" thematic class. The thematic class "edge" in thematic layer 114 in FIG. 24 has become thicker than the pixel values in image layer "Gauss" 115 that were darkened by the edge signals of the edge filter. Performing the expansion of the "edge" pixel locations as a pixel-oriented process is faster than manipulating objects to achieve an expansion of pixels linked to an object "edge". Where a pixel value is transferred from one object to another object, both objects must be redefined to transfer the pixel value. Changing the thematic class of individual pixel locations is faster.

Figure 25:
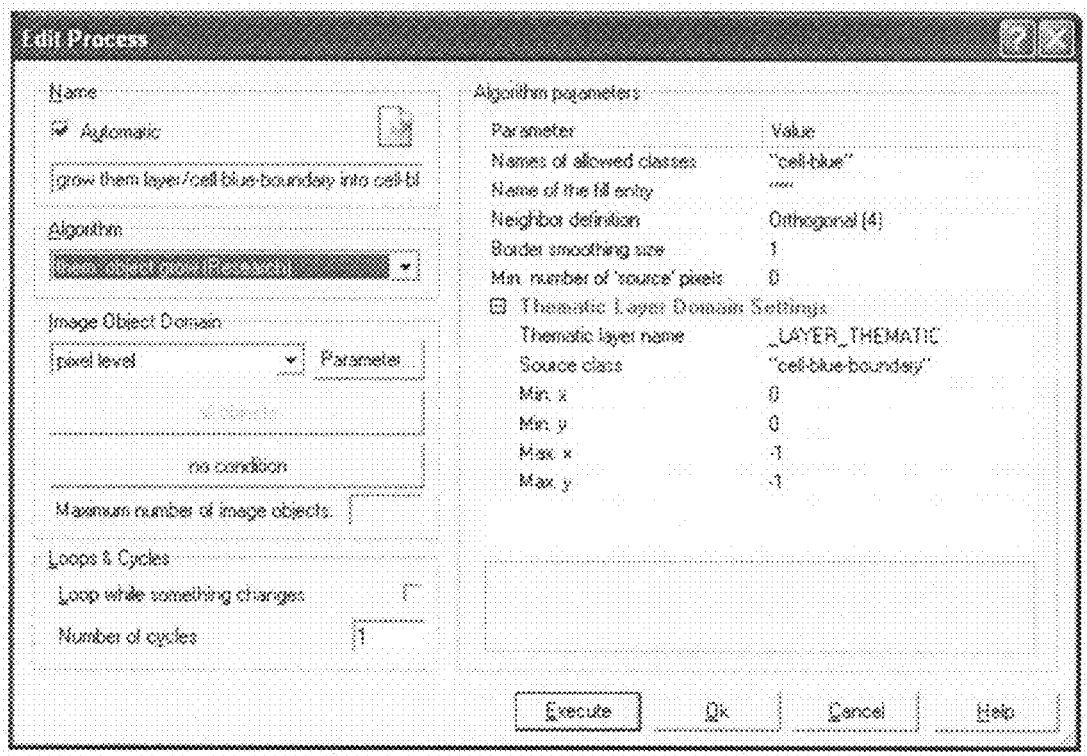
FIG. 25 is a screenshot of a pop-up window used to specify the process steps for growing pixels into neighboring thematic classes.

FIG. 25 shows a pop-up window of the graphical user interface used to specify the process steps for growing pixel locations into neighboring thematic classes in an application other than detecting nuclei in a microscopic digital image of cells. The option "pixel level" in the "Image Object Domain" box indicates that the process step will be applied at the pixel level as opposed to at the object level. In the example of FIG. 25, under "Algorithm Parameters", the user has specified that the pixel locations in the thematic class "cell-blue boundary" will be expanded into pixel locations with the thematic class "cell-blue".

Figure 26:
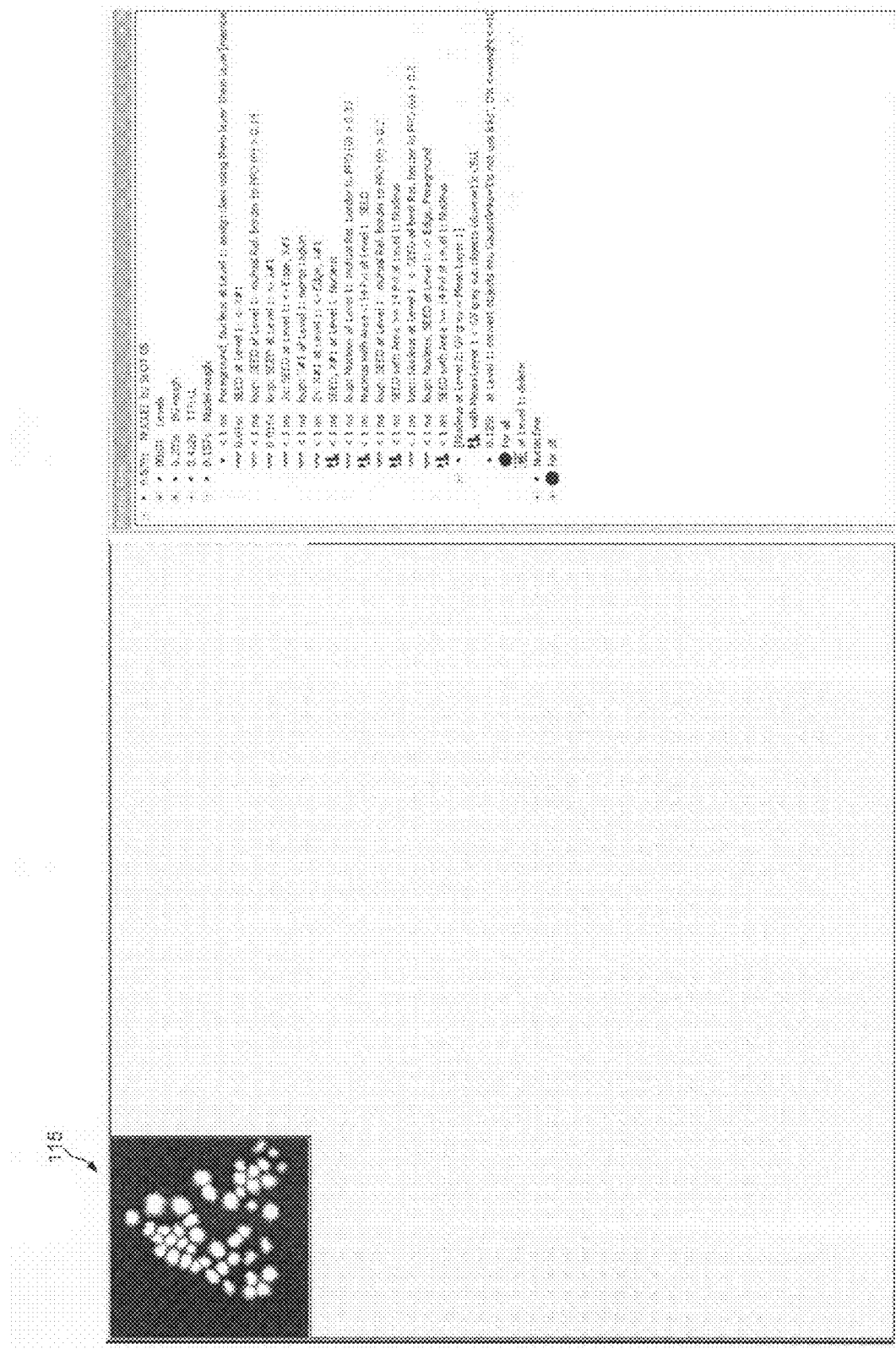
FIG. 26 is a screenshot of the user interface showing an image layer with highlighted objects that are linked to pixel values having specified thematic classes.

FIG. 26 shows that all of the pixels values of image layer "Gauss" 115 that have associated pixel locations classified in thematic layer 114 as "edge", "foreground" or "seed" are linked to individual objects for each nucleus. The boundary of each new nucleus object of the object network is highlighted in FIG. 26.

Figure 27:
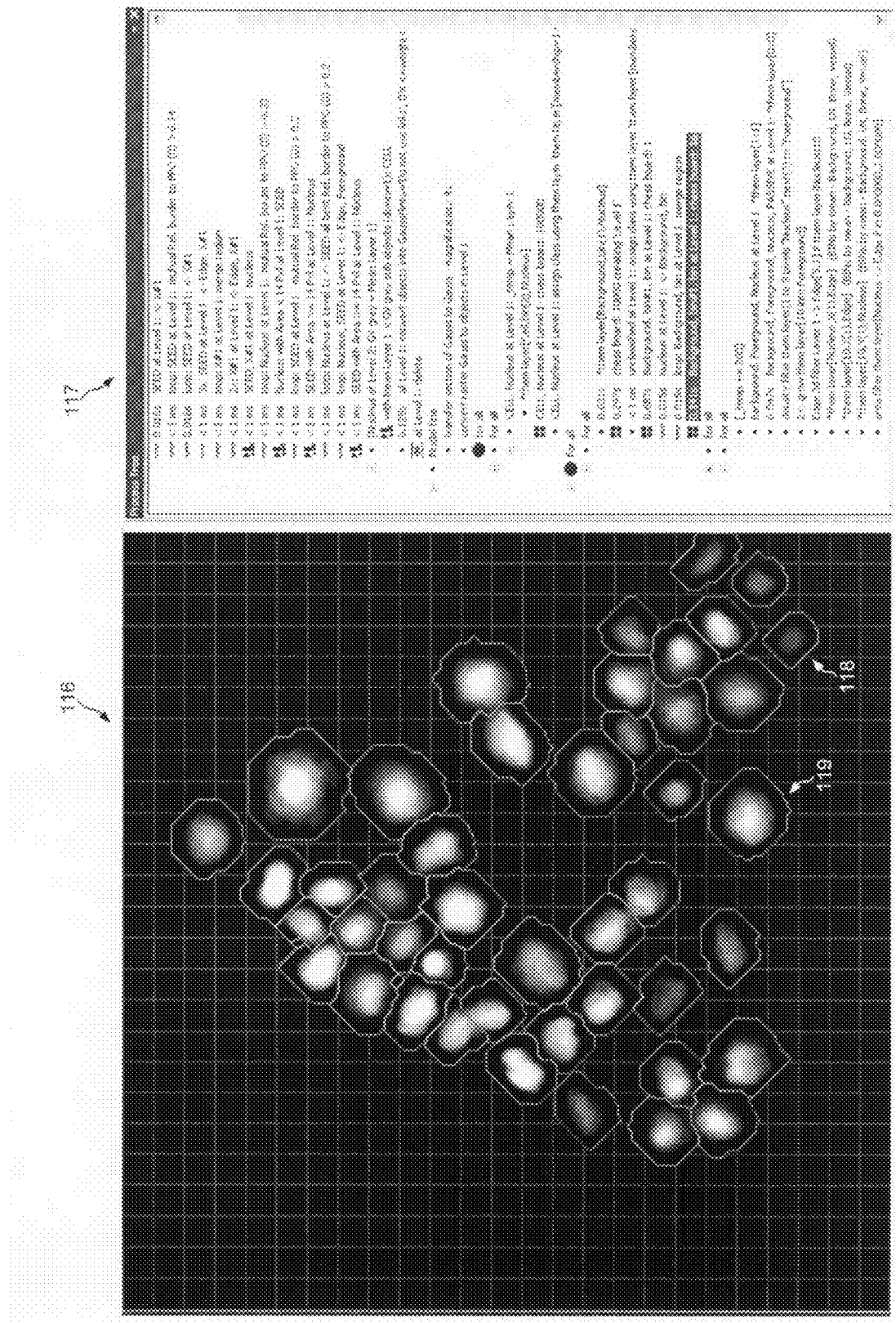
FIG. 27 is a screenshot of the user interface showing the image layer of FIG. 21 in which pixel values belonging to the neighborhood of each nucleus are encircled.

FIG. 27 shows an expanded image layer 116, which is first image layer 112 of FIG. 21 with the pixel values belonging to the neighborhood of each nucleus encircled. Some of the sub-process steps of the process hierarchy for detecting nuclei are shown in a box 117 at the right of FIG. 27. Expanded image layer 116 is generated from image layer "Gauss" 115 of FIG. 26. The brightness of each pixel value of image layer "Gauss" 115 is assigned to all sixteen pixel values of a 4×4 matrix of pixel values in expanded image layer 116. The boundary of each nucleus object of the object network, however, does not appear as a 4-pixel-wide edge in image layer 116 because the expansion is performed as an object-oriented process as opposed to a pixel-oriented process. Although each object depicted in image layer 116 is four times larger than the corresponding object depicted in image layer "Gauss" 115 of FIG. 26, the boundary of each nucleus is not specified as an object. Instead, the boundary of each "nucleus" object is identified in image layer 116 with a one-pixel-wide edge. The one-pixel-wide edge is then superimposed on first image layer 112.

By identifying the pixel values in the neighborhood of each nucleus, pixel-oriented processing can be performed locally on the pixel values identified using object-oriented processing. For example, the filter parameters applied to the pixel values linked to each object can be customized for that object. Where a Gaussian filter is applied, the amount of blur can be increased for larger objects; the blur parameter is proportional to the number of pixels linked to the object. In the example of FIG. 27, a thematic layer is generated from the pixel locations belonging to each object of the object network. The pixel locations belonging to each "nucleus" object are classified into the thematic classes "seed" and "background" using distinct brightness thresholds for each "nucleus" object. For example, the brightness threshold that distinguishes "background" and "seed" pixels in object 118 is darker than the brightness threshold that distinguishes these thematic classes in object 119. Finally, all of the pixel values associated with pixel locations in each "nucleus" object that have been assigned the thematic class "seed" are linked to new objects labeled "cell" (admittedly an inappropriate label for nucleus). All other pixel locations are linked to the object "background".

Figure 28:
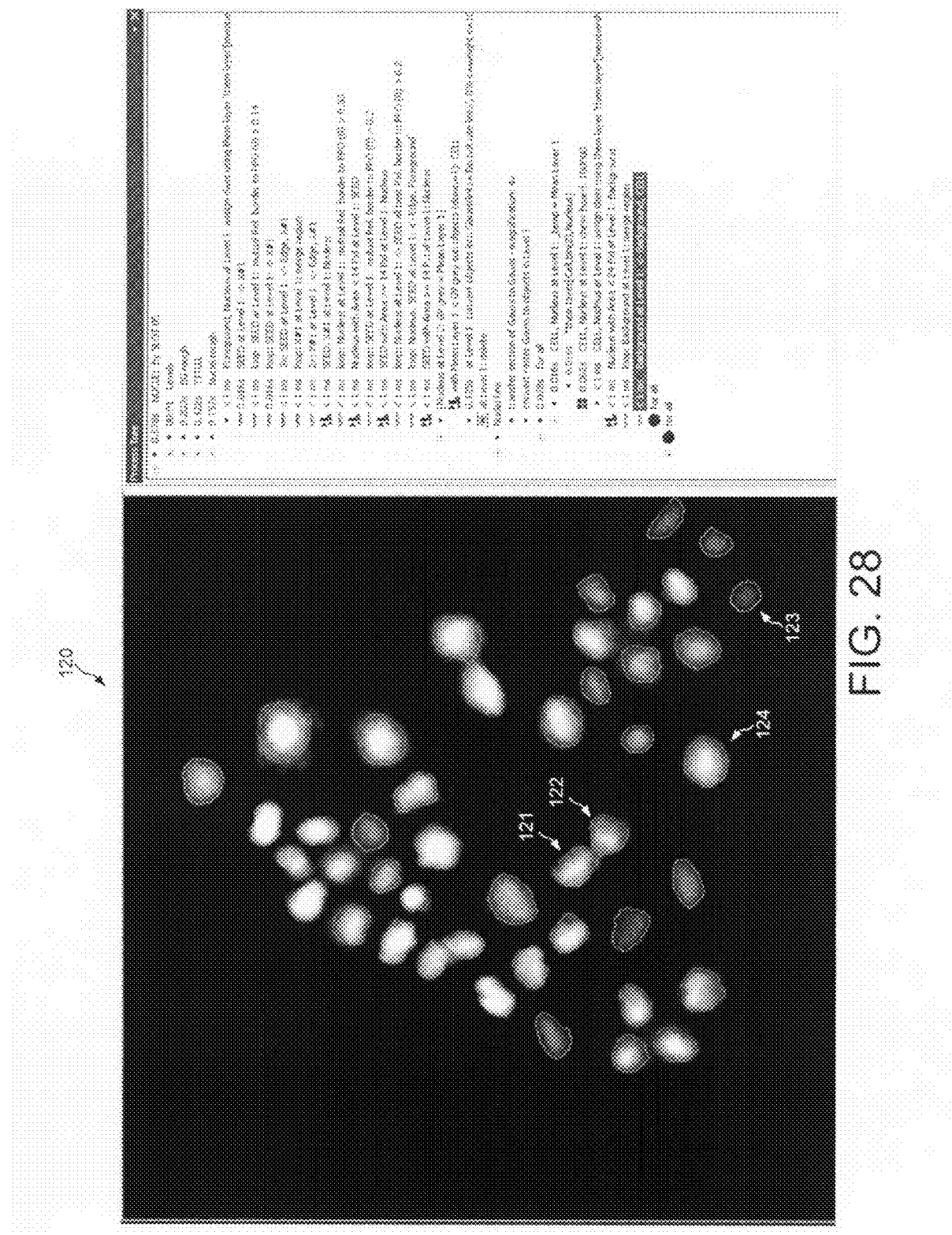
FIG. 28 is a screenshot of the user interface showing the image layer of FIG. 21 in which pixel values belonging to each nucleus are designated with a one-pixel-wide edge.

FIG. 28 shows a final image layer 120 in which the pixel values associated with pixel locations belonging to each nucleus are designated with a one-pixel-wide edge. The pixel locations associated with pixel values depicting the detected nuclei are linked to objects labeled "cell" in the object network. The characteristics of each nucleus can now be analyzed in more detail. For example, the area of the nuclei 121 and 122 is determined by counting the number of pixel locations linked to the object for nucleus 121 and to the object for nucleus 122. Determining the area of each of nuclei 121 and 122 would be less accurate using pixel-oriented processing alone. The prior art method of applying a filter to a mask area of a digital image would not accurately distinguish which pixel values belong to nucleus 121 as opposed to nucleus 122. The prior art method might even indicate that nuclei 121 and 122 are in fact one nucleus. Moreover, applying the same filter and processing parameters to all of the pixel values of first image layer 112 would probably not accurately detect both nucleus 123 and nucleus 124 because the pixel values of nucleus 124 are considerably darker than the pixel values of nucleus 123.

Figures 29, 30:
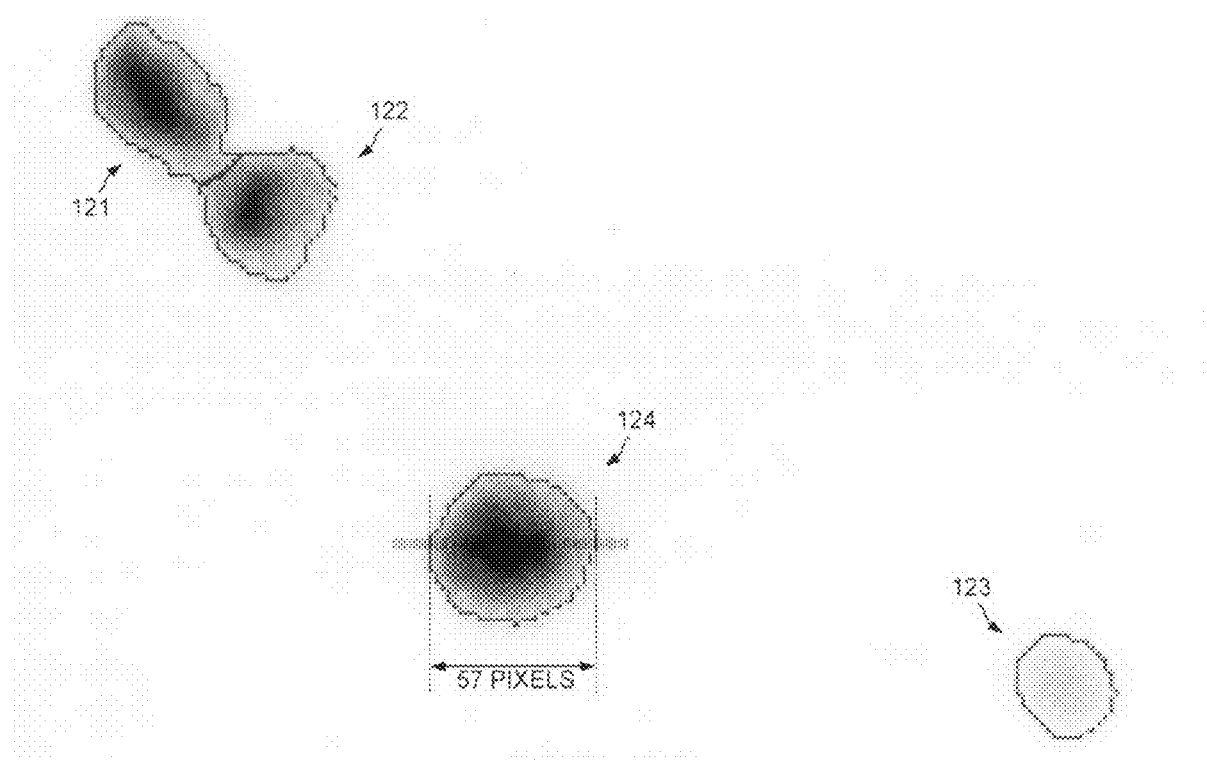
FIG. 29 is a negative image illustrating the dimensions of four nuclei detected in FIG. 28.
FIG. 30 is a table output by the analysis system that includes asymmetry and roundness factors for nuclei detected using the method of FIG. 10.

FIG. 29 shows a negative image of the detected nuclei 121-124 of FIG. 28 in more detail. In the negative image of FIG. 29, the widely differing mean brightness of the pixel values of nucleus 123 compared to nucleus 124 is more apparent. The characteristics of nuclei 123 and 124 that would be determined if those nuclei were detected using the same filter parameters would not be as accurate as the results obtained by the analysis system by applying customized filter parameters only to pixel values associated with pixel locations linked to a particular object. Besides area, another characteristic that can be determined for each nucleus is the length of the largest dimension. For example, the analysis system has determined that the length of the largest dimension of nucleus 124 is fifty-seven pixels. The analysis system also determines the asymmetry factor and the roundness factor for each nucleus.

FIG. 30 shows a tabular output of the analysis system that includes asymmetry and roundness factors for twenty-five of the 587 nuclei that were detected in the method of FIG. 10. The tabular output includes: the x and y pixel coordinates of the center of each nucleus, the object name and the thematic class name assigned to each nucleus, the area of each nucleus stated in number of pixel locations, the asymmetry factor and the roundness factor. An asymmetry factor of 0.0 denotes a perfectly symmetrical object. A roundness factor of 1.0 designates a circle. By determining the area of each nucleus object, the analysis system is able to reclassify as imaging artifacts those objects whose area is too small. For example, the pixel locations belonging to the "nucleus" object centered at x/y coordinates 725/1027 that is listed in FIG. 30 as having an area of only thirteen pixel locations would be reclassified as belonging to the "background" object.

FIG. 31 is a listing of high-level lines of XML code that corresponds to a script that implements a class network and a process hierarchy for detecting nuclear membranes according to the method of FIG. 10. The script was created and edited using a graphical user interface similar to the one shown in FIGS. 11-28. All of the lines of the XML code are present in an XML file entitled "CNL_nuclei-fast-optimization.txt" and contained in the CD Appendix.

FIGS. 32A-E show more lines of the XML code of FIG. 31. The XML description of selected process steps of FIG. 10, which are explained with reference to FIGS. 11-20, are identified by XML comments in FIGS. 32A-E. For example, FIG. 32A shows an XML description 125 of the object class "A#4" (as opposed to the thematic class "A#4"), which is identified with the class ID of "31". In addition to the specified classes, the analysis system also uses temporary helper classes and dynamically generated classes. These classes are generated at run time and are deleted before the final result of classification is achieved. Intermediate objects are linked to the helper classes and to the dynamically generated classes. The intermediate objects are reclassified as the analysis system iteratively performs the process steps to optimize the categorization of objects into the remainder of the specified classes.

Thus, performing the process steps of the process hierarchy is an adaptive process that is repeated and optimized on same digital image.

FIG. 32E shows an XML description 126 of the domain specification of the process step "A#4 at nuclei: for all" shown at the bottom of the process hierarchy in FIG. 19. The class ID "31" for the class "A#4" (nucleus) is listed under the list of classes <lClss> of the domain specification. The class ID in the domain specification generates a link between the domain specification and the class at run time. At run time, links are also generated from the domain specification of the process step to the actual objects of the data network that are determined to belong to the class "nucleus".

COMPACT DISC APPENDIX

The Compact Disc contains:

A) a file named CD Appendix Title Page.txt, which has 289 bytes and was written to disc on Feb. 21, 2007; and B) the file named CNL_nuclei-fast-optimization.txt (280 KB, written to disc on Feb. 21, 2007) which is an ASCII version of the XML representation shown in part in FIGS. 31-32.

Although the present invention has been described in connection with certain specific embodiments for instructional purposes, the present invention is not limited thereto. For example, although embodiments of the analysis system and computer-implemented network structure have been described above in relation to the computer-aided detection of nuclear membranes, the analysis system and network structure can equally be applied to detecting and analyzing target patterns in digital imagery of geographical objects, military targets and weather patterns. For example, the analysis system can be used to detect and analyze anatomical regions of the human body, as well as geographical regions. When analyzing geographical regions depicted in digital images captured from satellites or airplanes, thematic classes can be assigned to pixel locations that represent either urban areas or non-urban areas. Accordingly, various modifications, adaptations, and combinations of various features of the described embodiments can be practiced without departing from the scope of the invention as set forth in the claims.

What is claimed is:

1. A method comprising:
   (a) specifying an object class, wherein a first plurality of objects belongs to the object class;
   (b) specifying a filter;
   (c) specifying process steps of a process hierarchy;
   (d) acquiring first pixel values, wherein the first pixel values form a first image layer, and wherein the first pixel values are associated with first pixel locations;
   (e) executing the process steps on a computer to generate the first plurality of objects by linking some of the first pixel locations to each of the first plurality of objects, wherein the first plurality of objects forms a first object network;
   (f) linking each of the first plurality of objects to the object class;
   (g) generating a second image layer by applying the filter to those first pixel values associated with first pixel locations that are linked to one of the first plurality of objects, wherein filtered pixel values form the second image layer, and wherein the filtered pixel values are associated with second pixel locations;
   (h) generating a second object network by linking some of the second pixel locations to each of a second plurality of objects;
   (i) determining a characteristic of one of the second plurality of objects by measuring the object; and
   (j) displaying the measured object on a graphical user interface of the computer.

2. The method of claim 1, wherein the first image layer is stored in a memory space, and wherein the first image layer is overwritten by the second image layer in the memory space.

3. The method of claim 1, wherein the first object network comprises a third plurality of objects, wherein the second object network is the first object network in which the second plurality of objects is substituted for the first plurality of objects, and wherein the second object network comprises the third plurality of objects.

4. The method of claim 1, wherein the filter has a parameter, and wherein the parameter is updated for each of the first plurality of objects before those first pixel values associated with first pixel locations that are linked to each object are filtered.

5. The method of claim 1, wherein each of the first plurality of objects has a diameter, wherein the filter is an edge detection filter, and wherein the parameter is the diameter of each object.

6. The method of claim 1, wherein the one of the second plurality of objects has an area, and wherein the measuring measures the area.

7. The method of claim 1, wherein the object class represents nuclei in a microscopic image of a cell, wherein each nucleus has an area, and wherein the measuring the object in (i) measures the area of a nucleus.

8. A method comprising:
   (a) specifying an object class, wherein an object of a data network belongs to the object class;
   (b) specifying a thematic class;
   (c) specifying process steps of a process hierarchy;
   (d) acquiring first pixel values, wherein the first pixel values form a first image layer, and wherein the first pixel values are associated with first pixel locations;
   (e) executing the process steps on a computer to generate a second image layer of second pixel values by filtering the first pixel values of the first image layer, wherein the second pixel values are associated with second pixel locations;
   (f) generating a thematic layer by assigning the thematic class to certain of the second pixel locations;
   (g) generating a third image layer of third pixel values by processing those second pixel values associated with second pixel locations that are classified as belonging to the thematic class, wherein the third pixel values are associated with third pixel locations;
   (h) generating an object network based on the third pixel values, wherein the object network comprises the object, and wherein certain of the third pixel locations are linked to the object;
   (i) determining a characteristic of the object of the object network by measuring the object; and
   (j) displaying the measured object on a graphical user interface of the computer.

9. The method of claim 8, wherein the thematic layer generated in (f) is modified using a morphological operation before the third image layer is generated in (g).

10. The method of claim 9, wherein the morphological operation reclassifies certain of the second pixel locations as belonging to the thematic class.

11. The method of claim 8, wherein the object has a border with a length, and wherein the characteristic of the object is the length of the border.

12. The method of claim 8, wherein the thematic class is assigned to certain of the second pixel locations in (f) according to a classifier algorithm, and wherein the classifier algorithm determines whether each of the second pixel values associated with the second pixel locations exceeds a threshold value.

13. The method of claim 8, wherein the thematic class is assigned to certain of the second pixel locations in (f) according to a classifier algorithm, and wherein the classifier algorithm compares each of the second pixel values to its neighboring second pixel values of the second image layer.

14. A method comprising:
(a) specifying an object class and a thematic class, wherein an object of a data network belongs to the object class;
(b) specifying a first algorithm and a second algorithm;
(c) acquiring pixel values, wherein a first image layer comprises the pixel values;
(d) generating a second image layer by filtering the pixel values, wherein the filtered pixel values are associated with pixel locations;
(e) generating an object network of the data network by linking a first plurality of the pixel locations to the object based on the filtered pixel values;
(f) generating a thematic layer by assigning the thematic class to a second plurality of the pixel locations based on the filtered pixel values;
(g) executing the first algorithm on a computer to process those filtered pixel values that are associated with the first plurality of the pixel locations;
(h) executing the second algorithm on the computer to process those filtered pixel values that are associated with the second plurality of the pixel locations; and
(i) displaying the object on a graphical user interface of the computer.

15. The method of claim 14, wherein the second image layer is a digital image that includes an edge, and wherein the second algorithm detects the edge in the digital image by identifying each of the second plurality of the pixel locations that has a predetermined number of neighboring pixel locations belonging to the thematic class.

16. The method of claim 15, wherein the neighboring pixel locations consist of eight pixel locations that are contiguous to each pixel location belonging to the thematic class.

17. The method of claim 15, further comprising:
(j) assigning a second thematic class to each pixel location belonging to the thematic class that also has the predetermined number of neighboring pixel locations belonging to the thematic class; and
(k) increasing the number of pixel locations belonging to the second thematic class by assigning the second thematic class to each pixel location belonging to the thematic class that borders a pixel location belonging to the second thematic class.

18. The method of claim 14, wherein the first plurality of the pixel locations is a subset of the second plurality of the pixel locations, and wherein the thematic layer is generated in (f) only at pixel locations that are linked to the object.

19. The method of claim 14, wherein the object has a size, wherein the first algorithm has a parameter, wherein the parameter is based on the size of the object.

20. A method comprising:
(a) acquiring pixel values of a digital image that includes an edge, and wherein the pixel values are associated with pixel locations;
(b) generating an object network based on the pixel values, wherein the object network comprises an object, and wherein the object is linked to certain of the pixel locations;
(c) generating a thematic layer based on the pixel values, wherein the thematic layer has a first thematic class and a second thematic class, wherein the thematic layer is generated only at pixel locations that are linked to the object, and wherein the pixel locations are assigned the first thematic class or the second thematic class;
(d) detecting the edge in the digital image by identifying each pixel location belonging to the first thematic class that has a predetermined number of neighboring pixel locations belonging to the second thematic class; and
(e) displaying the edge in the digital image on a graphical user interface.

21. The method of claim 20, wherein the neighboring pixel locations consist of N2-1 pixel locations in a neighborhood surrounding each pixel location that belongs to the first thematic class, and wherein N is an odd integer greater than one.

22. The method of claim 21, wherein N is three, and wherein eight pixel locations in the neighborhood are contiguous to each pixel location that belongs to the first thematic class.

23. The method of claim 21, wherein N is nine, and wherein each pixel location belonging to the first thematic class is centered in a 9-by-9 matrix of pixel locations, eighty pixel locations of which comprise the neighborhood.

24. The method of claim 20, further comprising:
(f) assigning a third thematic class to each pixel location that belongs to the first thematic class and that is identified as having the predetermined number of neighboring pixel locations belonging to the second thematic class; and
(g) assigning the third thematic class to each pixel location that belongs to the second thematic class that neighbors a pixel location that has been assigned the third thematic class.

25. A method comprising:
(a) acquiring a digital image comprising pixel values;
(b) generating a thematic layer based on the pixel values, wherein a first thematic class and a plurality of other thematic classes are assigned to pixel locations associated with the pixel values;
(c) generating an object network by segmenting pixel locations associated with contiguous thematic classes of the thematic layer;
(d) assigning a first object class to objects of the object network that are linked to pixel locations assigned to the first thematic class;
(e) modifying the thematic layer classes for those pixel locations that are linked to the objects of the first object class;
(f) modifying the objects of the first object class by segmenting contiguous thematic classes of the thematic layer;
(g) classifying the objects of the object network according to membership in a second object class;
(h) measuring the objects that are assigned to the second object class; and
(i) displaying the measured objects on a graphical user interface.

26. The method of claim 25, wherein after the thematic layer is generated in (b), the thematic layer is modified using a mophological operation.

27. The method of claim 25, wherein the modifying in (f) is a morphological operation whose parameters depend on characteristics of the objects.

28. A method comprising:
(a) acquiring a digital image comprising pixel values;
(b) generating an object network by segmenting contiguous regions in the digital image;
(c) classifying the objects of the object network according to a membership function of a first object class;
(d) assigning a first thematic class to those pixel locations that are linked to the objects of the first object class;
(e) identifying pixel locations that are assigned the first thematic class and that fulfill a criterion of a second thematic class;
(f) resegmenting the objects of the first object class by grouping contiguous pixel locations assigned to the first thematic class and the second thematic class;
(g) classifying the objects of the object network according to a membership function of a second object class;
(h) measuring the objects that are assigned to the second object class; and
(i) displaying the measured objects on a graphical user interface.

29. The method of claim 28, wherein the criterion in (e) is determined based on both the number of pixel locations in a neighborhood of each pixel location of interest that are assigned the first thematic class and on whether each pixel value associated with the pixel locations in the neighborhood has a brightness below a specified threshold.

* * * * *